(12) United States Patent
Ishikawa

(10) Patent No.: US 8,022,957 B2
(45) Date of Patent: Sep. 20, 2011

(54) APPARATUS AND METHOD FOR PROCESSING DATA

(75) Inventor: Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 877 days.

(21) Appl. No.: 11/300,083

(22) Filed: Dec. 14, 2005

(65) Prior Publication Data

US 2006/0132874 A1   Jun. 22, 2006

(30) Foreign Application Priority Data

Dec. 20, 2004   (JP) ................................. 2004-368529

(51) Int. Cl.
*G06F 15/80*   (2006.01)
(52) U.S. Cl. ....................................... 345/505; 345/502
(58) Field of Classification Search .................. 345/502, 345/505, 506; 382/303–305, 307; 700/2, 700/4, 5, 11, 19
See application file for complete search history.

(56) References Cited

U.S. PATENT DOCUMENTS

| | | | | |
|---|---|---|---|---|
| 5,129,725 A * | 7/1992 | Ishizuka et al. | ............... | 356/617 |
| 5,394,250 A | 2/1995 | Shono | | |
| 5,436,736 A * | 7/1995 | Shono | .......................... | 358/3.19 |
| 5,692,210 A * | 11/1997 | Mita et al. | ..................... | 345/502 |
| 5,923,339 A * | 7/1999 | Date et al. | ..................... | 345/505 |
| 5,926,559 A * | 7/1999 | Ohta | .............................. | 382/162 |
| 5,978,827 A * | 11/1999 | Ichikawa | ...................... | 708/709 |
| 6,249,288 B1 * | 6/2001 | Campbell | ..................... | 345/629 |
| 6,266,072 B1 * | 7/2001 | Koga et al. | .................... | 345/505 |
| 6,289,138 B1 * | 9/2001 | Yip et al. | ....................... | 382/307 |
| 6,347,344 B1 * | 2/2002 | Baker et al. | ...................... | 710/20 |
| 6,373,980 B2 * | 4/2002 | Ohta | ............................. | 382/167 |
| 6,429,871 B1 * | 8/2002 | Katsura et al. | ................. | 345/501 |
| 6,636,214 B1 * | 10/2003 | Leather et al. | ................. | 345/422 |
| 6,643,029 B2 * | 11/2003 | Kumada et al. | ................ | 358/1.9 |
| 6,725,299 B2 * | 4/2004 | Lie | ................................... | 710/57 |
| 6,952,214 B2 * | 10/2005 | Naegle et al. | ................. | 345/506 |
| 7,015,975 B2 * | 3/2006 | Miyaguchi et al. | ........... | 348/571 |
| 7,266,254 B2 | 9/2007 | Ishikawa et al. | | |
| 7,436,559 B2 * | 10/2008 | Yamazaki et al. | ............ | 358/534 |
| 7,447,384 B2 * | 11/2008 | Kitora et al. | .................. | 382/305 |
| 7,460,285 B2 * | 12/2008 | Yamazaki et al. | ............ | 358/534 |
| 7,542,041 B2 * | 6/2009 | Dutta et al. | ..................... | 345/506 |
| 2002/0004859 A1 * | 1/2002 | Stoney | ............................. | 710/7 |
| 2003/0137695 A1 * | 7/2003 | Nomizu | ........................ | 358/1.16 |
| 2003/0158608 A1 * | 8/2003 | Ishikawa et al. | .................. | 700/2 |
| 2003/0228016 A1 * | 12/2003 | Shimada | ....................... | 380/213 |

FOREIGN PATENT DOCUMENTS

| | | |
|---|---|---|
| JP | 5-183737 A | 7/1993 |
| JP | H07-074973 A | 3/1995 |
| JP | 2003-224469 A | 8/2003 |
| JP | 2004-220432 A | 8/2004 |
| JP | 2004-222069 A | 8/2004 |
| JP | 2004-248066 A | 9/2004 |
| WO | WO02-095946 A1 | 11/2002 |

* cited by examiner

*Primary Examiner* — Xiao M Wu
*Assistant Examiner* — Charles Tseng
(74) *Attorney, Agent, or Firm* — Canon U.S.A., Inc., IP Division

(57) ABSTRACT

A data processing apparatus includes a plurality of processing units each performing a respective one of process parts into which a predetermined process to be performed on data is divided, and a changing unit that changes a connection between the plurality of processing units on the basis of setting parameters that are set to enable a plurality of types of processing procedures.

25 Claims, 16 Drawing Sheets

APPARATUS AND METHOD FOR PROCESSING DATA

BACKGROUND OF THE INVENTION

1. Field of the Invention

The present invention relates to an apparatus and a method for processing data that are used for recording or displaying color image data and are suitable for image processing.

2. Description of the Related Art

When natural image (picture) data is output with a printer, various types of image processing are required to obtain an image of satisfactory quality. FIG. 18 is a block diagram showing a general image-processing unit for outputting natural image data with a printer.

An input gamma converter 201 converts image data stored in a frame buffer 200 to signals that are linear in density, and a color converter 202 converts these signals to color material data of a printer (i.e., colors produced by an output device). Then, an output gamma converter 203 performs output gamma correction, and a halftone processing unit 204 converts the output data from the output gamma converter 203 to bitmap data (a dot pattern).

When error diffusion is used as a method for halftone processing of image data in this process, a line buffer 205 is used to diffuse a quantization error of a pixel of interest to surrounding pixels. The obtained bitmap data is temporarily stored in a page buffer 206. In general, a method (band processing) is used, in which parts of a page (a frame) are sequentially processed as bands to save the memory space of each of the frame buffer 200 and the page buffer 206. Hereinafter, it is presumed that band processing is used and that the line buffer 205 and the page buffer 206 are not distinguished from each other and are referred to as a band buffer.

Subsequently, when a print engine (not shown) is activated, the aforementioned bitmap data is read from the band buffer and an image is printed in synchronization with the engine.

The details of this series of operations vary with types of input images, print engines, or the like. For example, when the input image is monochrome, color conversion is omitted. When the input image is a natural image, error diffusion method is used as a method for halftone processing. On the other hand, when the input image is a graphic image, dithering is used as a method for halftone processing (for example, refer to Japanese Patent Laid-Open No. 5-183737). Color conversion corresponding to the number of colors produced by an output device is required. For example, when the number of colors produced by an output device is three, i.e., cyan, magenta, and yellow (CMY), color conversion corresponding to the three colors is required. Moreover, color conversion corresponding to more than three colors includes two separate steps: a first step of color matching and a second step of conversion to colors produced by an output device. In general, image data is processed with software executed on a processor, such as a CPU, to handle various types of input data, print engines, or the like, as described above.

However, image processing with software has a disadvantage such that the processing speed cannot keep up with an increase in the resolution of an input image. On the other hand, when various types of image processing are performed with hardware, separate hardware units corresponding to individual processing modes are required. Thus, a problem occurs, such that the size of the circuit becomes large. Moreover, a further problem exists, such that the entire structure of the hardware must be rebuilt, for example, when the specifications are changed.

SUMMARY OF THE INVENTION

The present invention provides a flexible data processing apparatus that can handle various types of processing modes.

A data processing apparatus according to one aspect of the present invention includes a plurality of processing units each performing a respective one of process parts into which a predetermined process to be performed on data is divided, and a changing unit that changes a connection between the plurality of processing units on the basis of setting parameters that are set to enable a plurality of types of processing procedures.

A data processing apparatus according to another aspect of the present invention includes a plurality of data processing modules, an external memory, and a controlling unit. Each of the plurality of data processing modules includes a plurality of processing units each performing a respective one of process parts into which a predetermined process to be performed on data is divided, a changing unit that changes a connection between the plurality of processing units on the basis of setting parameters that are set to enable a plurality of types of processing procedures, a reading unit that includes a first address generating unit and a first buffer, the first address generating unit generating a read address on the basis of the setting parameters, and that reads data from the external memory on the basis of the read address and stores the data in the first buffer, and a writing unit that includes a second address generating unit and a second buffer, the second address generating unit generating a write address on the basis of the setting parameters, and that writes data stored in the second buffer to the external memory on the basis of the write address. The plurality of processing units perform the plurality of corresponding process parts on the data stored in the first buffer and write the resulting data to the second buffer. The controlling unit detects when the reading unit completes reading of data or when the writing unit completes writing of data and sets the setting parameters so as to control data processing by the data processing modules.

Further features of the present invention will become apparent from the following description of exemplary embodiments with reference to the attached drawings.

DESCRIPTION OF THE EMBODIMENTS

An exemplary embodiment according to the present invention will now be described in detail with reference to the accompanying drawings.

Figure 1:
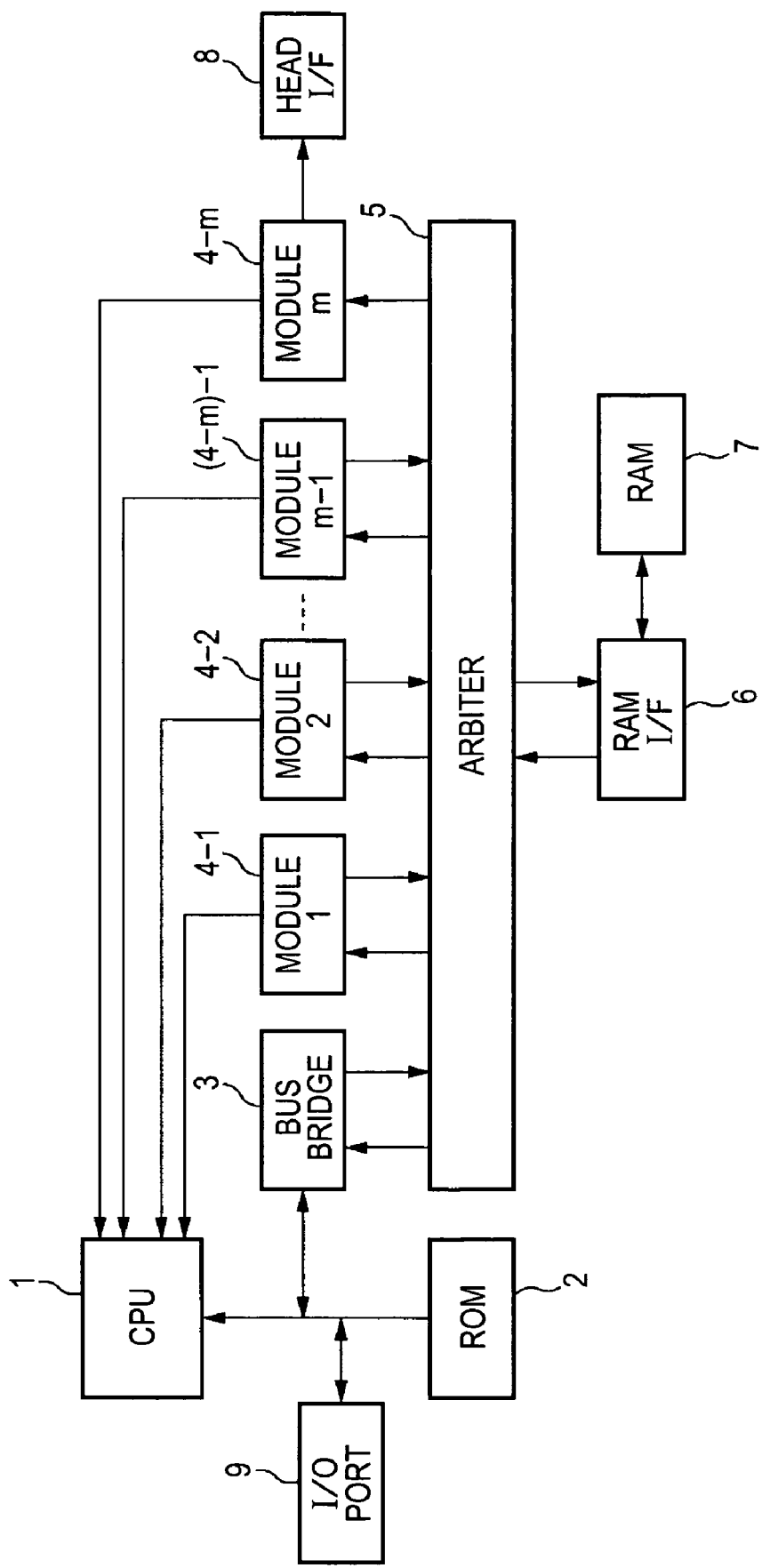
FIG. 1 is a block diagram showing the structure of an exemplary image-processing apparatus according to an exemplary embodiment of the present invention.

FIG. 1 is a block diagram showing the structure of an exemplary image-processing apparatus according to the present embodiment. The image-processing apparatus includes a CPU 1 that controls individual components of the image-processing apparatus, a ROM 2 that stores programs and the like, a bus bridge 3, m image-processing modules 4-1 to 4-m (collectively referred to as an image-processing module 4) where m is an integer greater than one, a DRAM 7, an arbiter 5 that arbitrates access to the DRAM 7, a DRAM interface 6, a head interface 8, and an I/O port 9.

In the present embodiment, the DRAM 7 is shared by the CPU 1 and the image-processing module 4. Alternatively, the CPU 1 may include another RAM that is not assigned to the image-processing module 4 to maintain performance.

The processing operation of the image-processing apparatus having the aforementioned structure will now be described.

The CPU 1 first receives image data to be processed from the I/O port 9 according to a program stored in the ROM 2 and stores the image data in the DRAM 7 via the bus bridge 3, the arbiter 5, and the DRAM interface 6. Then, the CPU 1 sets parameters in a configuration register of the image-processing module 4-1 to operate the image-processing module 4-1. A configuration register is provided in each image-processing module and stores parameters for controlling the operation of the image-processing module. For example, the configuration register of the image-processing module 4-1 stores an address range of the DRAM 7 that stores data to be processed by the image-processing module 4-1 and an address range of the DRAM 7 in which data processed by the image-processing module 4-1 is to be stored as the parameters.

When the image-processing module 4-1 finishes reading data from an address range of the DRAM 7 that is set in the configuration register or finishes writing data to another address range of the DRAM 7 that is set in the configuration register, the image-processing module 4-1 generates an interrupt to send a completion message to the CPU 1.

When the CPU 1 is interrupted, the CPU 1 analyzes the cause of the interrupt. When the cause of the interrupt is completion of reading data to be processed by the image-processing module 4-1, the CPU 1 sets an address range from which data to be processed next is read in the configuration register of the image-processing module 4-1 and causes the image-processing module 4-1 to continue the processing. When the cause of the interrupt is completion of writing data processed by the image-processing module 4-1, the CPU 1 sets an address range in which the next processed data is stored in the configuration register of the image-processing module 4-1, causes the image-processing module 4-1 to continue the processing, sets parameters in a configuration register of the image-processing module 4-2, and causes the image-processing module 4-2 to operate.

The image-processing module 4-2 performs predetermined processing. When the image-processing module 4-2 finishes reading data from an address range that is set in the configuration register or finishes writing processed data to another address range that is set in the configuration register, the image-processing module 4-2 generates an interrupt to send a completion message to the CPU 1. When the CPU 1 is interrupted, the CPU 1 analyzes the cause of the interrupt. When the cause of the interrupt is completion of reading data to be processed by the image-processing module 4-2, the CPU 1 sets an address range from which data to be processed next is read in the configuration register of the image-processing module 4-2 and causes the image-processing module 4-2 to continue the processing. When the cause of the interrupt is completion of writing data processed by the image-processing module 4-2, the CPU 1 sets an address range in which the next processed data is stored in the configuration register of the image-processing module 4-2, causes the image-processing module 4-2 to continue the processing, sets parameters in a configuration register of the image-processing module 4-3, and causes the image-processing module 4-3 to operate.

A pipeline mechanism that includes a plurality of image-processing modules can be achieved by activating an image-processing module after the preceding image-processing module has completed the processing so that processed data is sequentially passed between the image-processing modules, as described above.

Subsequently, when the image-processing module (4-m)-1 completes the processing and a predetermined amount of bitmap data or more is generated, a print engine (not shown) is activated. The image-processing module 4-m sends the bitmap data to the print engine via the head interface 8 in synchronization with a synchronizing signal of the print engine. In this way, an image is printed.

Figure 2:
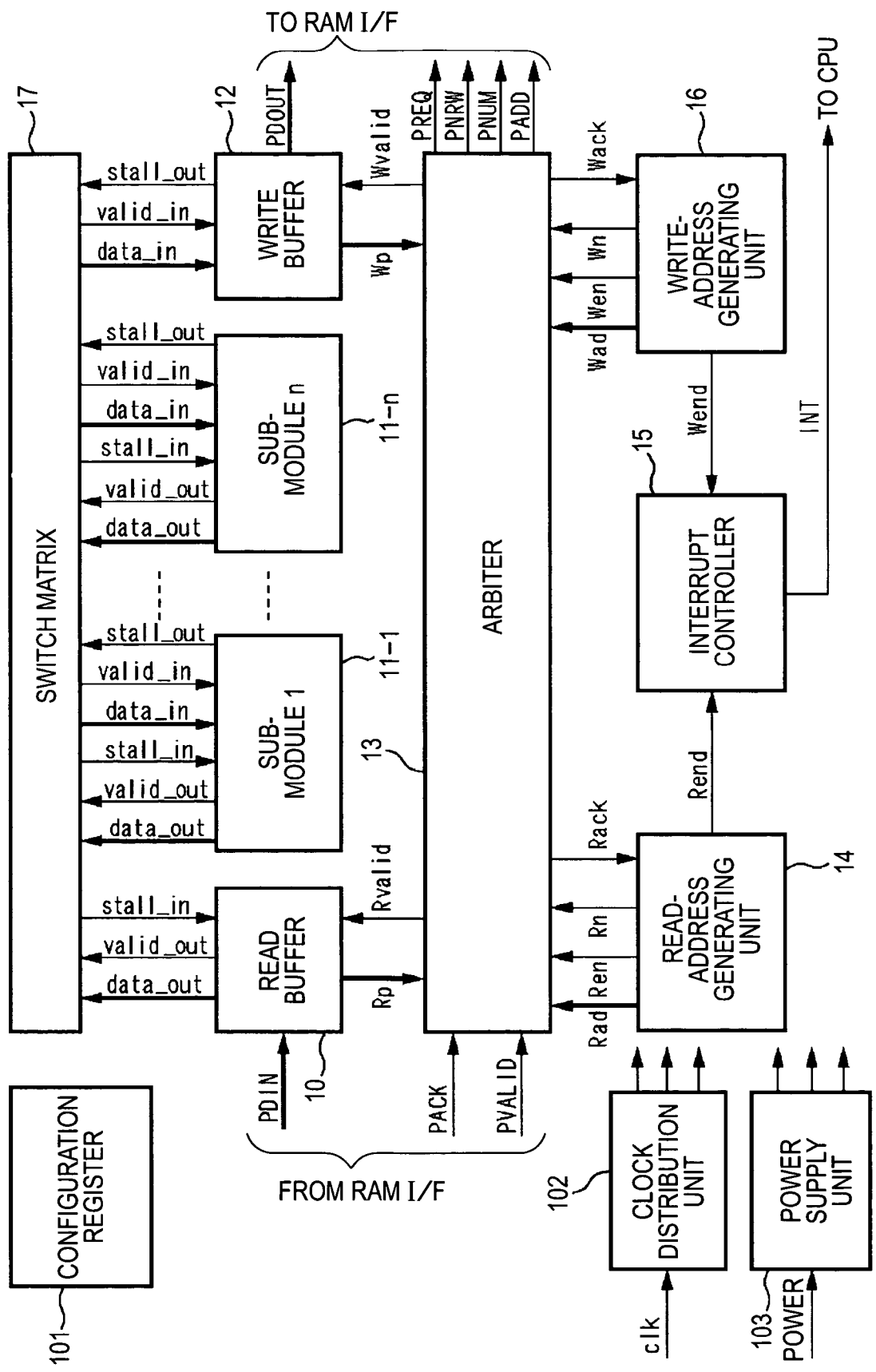
FIG. 2 is a block diagram showing the structure of a module included in the image-processing apparatus according to the exemplary embodiment of the present invention.

FIG. 2 is a block diagram showing a detailed structure of the image-processing module 4 included in the image-processing apparatus according to this exemplary embodiment. The image-processing module 4 includes a read buffer 10, sub-modules 11-1 to 11-n (collectively referred to as a sub-module 11), a write buffer 12, an arbiter 13, a read-address generating unit 14, an interrupt controller 15, a write-address generating unit 16, and a switch matrix 17.

Operation parameters of the switch matrix 17, the read-address generating unit 14, the write-address generating unit 16, and the like are set in a configuration register 101. A clock distribution unit 102 distributes a clock pulse clk of a device to individual parts of the image-processing module 4. The clock distribution unit 102 stops distributing the clock pulse clk to any sub-module by means of the settings of the configuration register 101. A power supply unit 103 controls power supply to the individual parts of the image-processing module 4. Power supply to any sub-module can be stopped by means of the settings of the configuration register 101.

The CPU 1 sets the operation parameters in the configuration register 101 of the image-processing module 4, as described above. A read start address and a read end address are set for the read-address generating unit 14 by means of these settings, and a read enable signal Ren is generated. A write start address and a write end address are set for the write-address generating unit 16 by means of the settings of the parameters in the configuration register 101, and a write enable signal Wen is generated.

The arbiter 13 detects a free space Rp of the read buffer 10 and the read enable signal Ren from the read-address generating unit 14, and issues a read request (PREQ=1, PNRW=0, PNUM=Rn, and PADD=Rad, where PREQ is a request signal, PNRW is a signal that indicates the request type: PNRW=0 is a read request and PNRW=1 is a write request, PNUM is a signal that indicates the number of transferred words, and PADD is a signal that indicates a read or write address) to the arbiter 5 when a read address is valid (Ren=1) and thus data can be stored in the read buffer 10 (Rp≧Rn where Rn is a unit of read access to the DRAM 7 and is described below). On the other hand, when an accumulated data amount Wp of the write buffer 12 becomes equal to or more than a predetermined number of words (Wp≧Wn where Wn is a unit of write access to the DRAM 7 and is described below), the arbiter 13 detects the write enable signal Wen from the write-address generating unit 16 and issues a write request to the arbiter 5. That is to say, when a write address is valid (Wen=1) and data can be output from the write buffer 12 (Wp≧Wn), a write request (PREQ=1, PNRW=1, PNUM=Wn, and PADD=Wad) is issued to the arbiter 5.

When the arbiter 5 receives the request signal PREQ from the image-processing module 4, the arbiter 5 determines the request type, i.e., PNRW=0 is a read request and PNRW=1 is a write request, on the basis of PNRW and detects the number of transferred words from PNUM and the address from PADD. When no request is sent from the CPU 1 and other image-processing modules, the arbiter 5 starts accessing the data to be read from the DRAM 7 via the DRAM interface 6. When the arbiter 5 accepts the request, the arbiter 5 sends an acknowledgement signal PACK to the requesting image-processing module. On the other hand, when any request is sent from the CPU 1 and other image-processing modules, the request is accepted according to the priority of the request.

In the case of the read request, when the arbiter 13 receives the acknowledgement signal PACK from the arbiter 5, the arbiter 13 sends an acknowledgement signal Rack to the requesting read-address generating unit 14. The read-address generating unit 14 generates a read address of data to be next read from the DRAM 7 upon receiving the acknowledgement signal Rack. At this time, when the requested read address is the read end address set in the configuration register 101, the read enable signal Ren is reset, and a read end signal Rend is output to the interrupt controller 15.

On the other hand, in the case of the write request, when the arbiter 13 receives the acknowledgement signal PACK from the arbiter 5, the arbiter 13 sends an acknowledgement signal Wack to the requesting write-address generating unit 16. The write-address generating unit 16 generates a write address of data to be next written to the DRAM 7 upon receiving the acknowledgement signal Wack. At this time, when the requested write address is the write end address set in the configuration register 101, the write enable signal Wen is reset, and a write end signal Wend is output to the interrupt controller 15.

The settings of the configuration register 101 are arranged so that the interrupt controller 15 can set a read-end interrupt mask and a write-end interrupt mask. When each of these interrupt masks is set so that interrupt is enabled, an interrupt signal INT is generated by means of the read end signal Rend or the write end signal Wend and sent to the CPU 1.

The CPU 1 reads the status of the interrupt controller 15 upon receiving the interrupt signal INT. When the cause of the interrupt is read end, the CPU 1 cancels the interrupt by resetting the read-end interrupt mask. When the processing continues, the read-end interrupt mask is set after the read start address and the read end address are reset in the configuration register 101, the read enable signal is set, and any other required processing is performed. Similarly, when the cause of the interrupt is write end, the CPU 1 cancels the interrupt by resetting the write-end interrupt mask. When the processing continues, the write-end interrupt mask is set after the write start address and the write end address are reset in the configuration register 101, the write enable signal is set, and any other required processing is performed.

When the arbiter 5 starts to access the DRAM 7 upon accepting a read request (PREQ=1, PNRW=0, PNUM=Rn, and PADD=Rad) and data is successfully read from the DRAM 7, the arbiter 5 sends a signal PVALID that indicates that the data in the DRAM 7 is valid to the requesting image-processing module. In the requesting image-processing module, the arbiter 13 sends a signal Rvalid that indicates that the data is valid to the read buffer 10. While the signal Rvalid is set, the read buffer 10 retrieves data on DRAM data output signal line PDIN and stores. The data is read from an area of the DRAM 7 indicated by an address of the DRAM 7 and stored in the read buffer 10 in the requesting module by means of this operation. This address is a read address generated by the read-address generating unit 14 and specified by PADD (=Rad).

On the other hand, when the arbiter 5 starts to access the DRAM 7 upon accepting a write request (PREQ=1, PNRW=1, PNUM=Wn, and PADD=Wad) and data is written to the DRAM 7, the arbiter 5 sends the signal PVALID to the requesting image-processing module when the data is written to the DRAM 7. In the requesting image-processing module, the arbiter 13 sends a signal Wvalid that indicates that the data is valid to the write buffer 12. While the signal Wvalid is set, the write buffer 12 outputs the data to be written to the DRAM 7 to DRAM data input signal line PDOUT. The data in the write buffer 12 in the requesting module is stored in an area of the DRAM 7 indicated by an address of the DRAM 7 by means of this operation. This address is a write address generated by the write-address generating unit 16 and specified by PADD (=Wad).

When data to be processed by the sub-module 11 becomes available, the read buffer 10 sets a signal valid_out that indicates that the data is available. In contrast, when the data to be processed by the sub-module 11 is not available yet, the read buffer 10 resets the signal valid_out. Moreover, when a hold-request signal stall_in from the sub-module 11 is not set, the read buffer 10 sequentially outputs the stored data in synchronization with a clock pulse. In contrast, when the hold-request signal stall_in from the sub-module 11 is set, the read buffer 10 does not update the stored data. The sub-module 11 receives only data with which the signal valid_out is set. When the sub-module 11 is not ready to receive the data, the sub-module 11 sets the hold-request signal stall_in to cause the read buffer 10 to hold the data to be output. When the input data need not be sorted, the read buffer 10 can be set in the first-in first-out (FIFO) mode. Similarly, when the output data need not be sorted, the write buffer 12 can be set in the FIFO mode.

The image-processing module 4 includes more than one sub-module 11, and data is passed between the sub-modules by means of the same operation as described above (handshaking by means of a signal valid and a hold-request signal stall where each signal with a suffix "_in" of one sub-module and each signal with a suffix "_out" of another sub-module are linked together).

Figure 3:
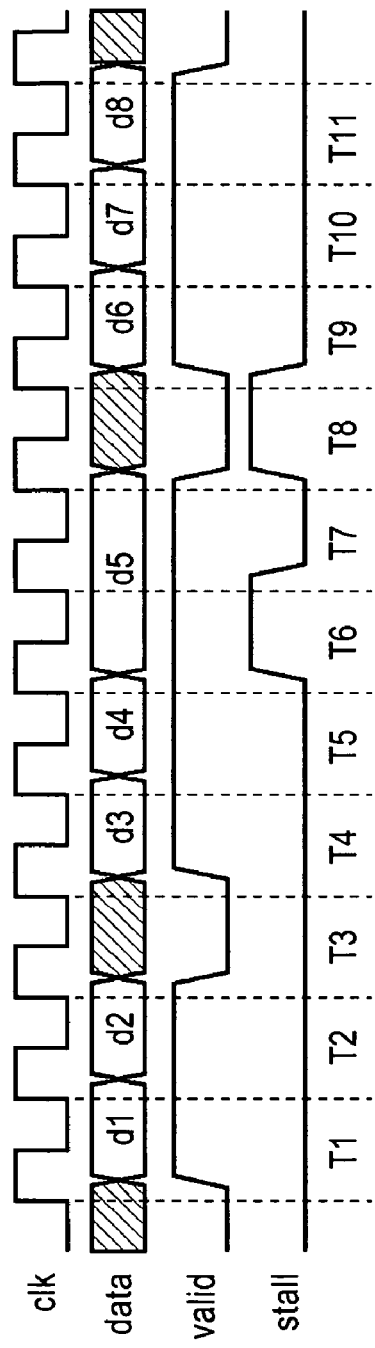
FIG. 3 is a timing chart showing the operation of interfaces between sub-modules.

FIG. 3 is a timing chart showing signal exchange (the aforementioned handshaking) between the sub-modules, the read buffer, and the write buffer. The data-transmitting sub-module 11 sets a data signal data and the signal valid on the rising edge of a clock pulse clk when data can be output (T1). Subsequently, when the hold-request signal stall from the data-recipient is not set on the rising edge of the next clock pulse clk, it is assumed that the data has been received, and the data signal data and the signal valid are set in a case where the next data can be output (T2). Then, when the next data cannot be output, the signal valid is reset (T3). Subsequently, when the hold-request signal stall from the data-recipient is set on the rising edge of the clock pulse clk, it is assumed that the data has not been received by the data-recipient because the data-recipient is busy, and the data signal data and the signal valid are held as they are (T7). Subsequently, when the data-recipient becomes ready, the held data is received and the hold-request signal stall is reset because the signal valid is held in a state in which the signal valid is set. Even in a case where the hold-request signal stall from the data-recipient is set, when the signal valid is not set (T8), the data is invalid. Thus, the data signal data and the signal valid are not held, and the next valid data is output (T9). That is to say, when the signal valid is not set, the hold-request signal stall is ignored.

When the data-receiving sub-module is ready to receive the data signal data, the data-receiving sub-module receives the data signal data with which the signal valid is set on the rising edge of the clock pulse clk (T1, T2, T4, and T5). When the data-receiving sub-module is not ready to receive the data signal data, the data-receiving sub-module sets the hold-request signal stall so as to cause the data-transmitting sub-module to hold data output d5 and the signal valid (T6). Subsequently, when the data-receiving sub-module is ready to receive the data signal data, the data-receiving sub-module resets the hold-request signal stall so as to receive the data output d5 from the data-transmitting sub-module (T7).

When the write buffer 12 has a free space, the write buffer 12 stores a data signal data_out from the sub-module 11 with which a signal valid_out is set. When the write buffer 12 has no free space, the write buffer 12 sets a hold-request signal stall_out so as to cause the sub-module 11 to hold the output data.

The switch matrix 17 provides connection between the individual sub-modules 11, the read buffer 10, and the write buffer 12. That is to say, the switch matrix 17 links data_out, valid_out, and stall_in of the read buffer 10 or one sub-module to data_in, valid_in, and stall_out of the write buffer 12 or another sub-module, respectively. This connection is achieved by means of the settings of the configuration register 101. Thus, the connection between the modules can be dynamically changed, according to the type of processing, by the CPU 1 changing the connection state of the switch matrix 17 by means of the settings of the parameters of the configuration register 101.

The switch matrix 17 includes a known crossbar switch or a group of known selectors. In general, selectors are suitable for a case where the number of combinations of the connections is limited, and a crossbar switch is suitable for a case where the number of combinations of the connections is not limited.

The number of bits of data_out of a sender need not necessarily correspond to that of data_in of a receiver as far as valid bits can be determined according to the connection information. That is to say, out of output bits in data_out, only bits that are valid for data_in need to be connected to data_in. Thus, unnecessary connection circuits can be eliminated. Moreover, the clock distribution unit 102 and/or the power supply unit 103 is controlled by means of the settings of the configuration register 101 to stop supply of a clock pulse and/or power to any sub-module that is not connected to a data path, i.e., a module not in use, so that power consumption can be reduced.

Figure 4:
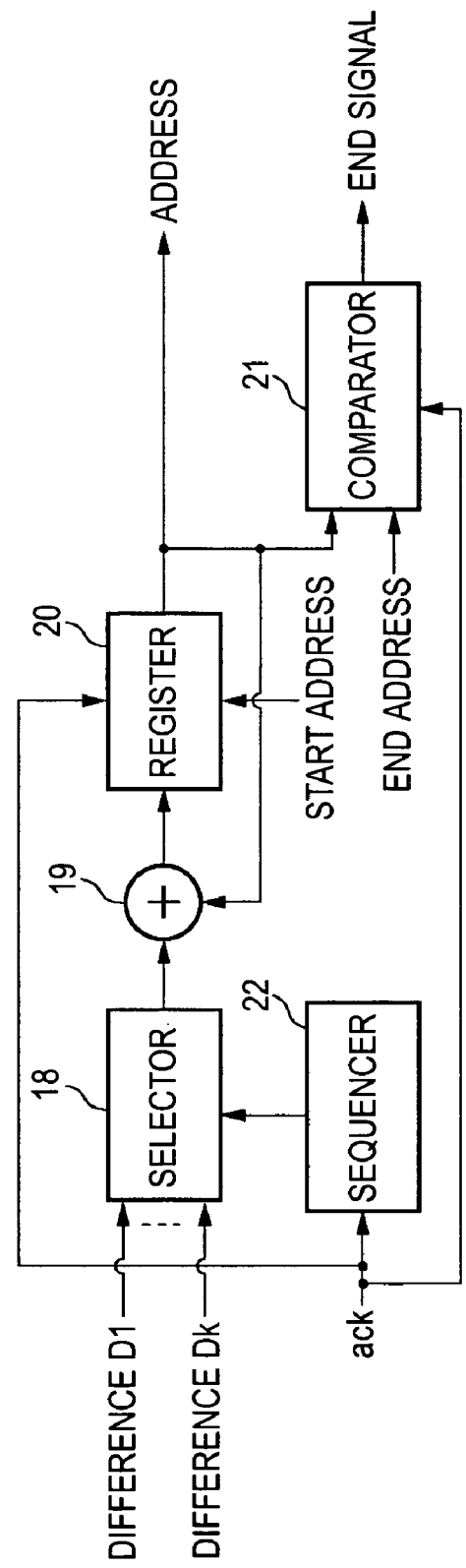
FIG. 4 is a block diagram showing the structure of an address generating unit in each module in the image-processing apparatus according to the exemplary embodiment of the present invention.

FIG. 4 is a block diagram showing the structure of each of the read-address generating unit 14 and the write-address generating unit 16 in the individual modules in the image-processing apparatus according to this exemplary embodiment. The read-address generating unit 14 and the write-address generating unit 16 have the same structure, and thus, both of them will be described with reference to FIG. 4. Each address generating unit includes a selector 18, an adding unit 19, a register 20, a comparator 21, and a sequencer 22.

The CPU 1 first sets a start address in the register 20. The sequencer 22 changes the state according to a request acknowledgement signal ack (Rack or Wack), and the selector 18 selects an address difference according to the state. For example, the sequencer 22 includes at least one counter. The at least one counter counts up or down in response to the request acknowledgement signal ack and performs carry or borrow so as to control the selector 18. Thus, the address difference output from the selector 18 is changed every predetermined number of accesses. In this exemplary embodiment, a unit of access to the DRAM 7 is a plurality of words to improve the efficiency of data transfer to the DRAM 7. Thus, when unnecessary data exists in a unit of access, i.e., when addresses in the unit of access are discontiguous, the number n (Rn or Wn) of words in the unit of access is changed to prevent unnecessary access.

The adding unit 19 adds the selected address difference to the last address, and the register 20 stores the resulting value in response to the acknowledgement signal ack. The comparator 21 compares the output of the register 20 with an end address. When the output of the register 20, i.e., an address output from the address generating unit, is equal to the end address, an end signal is set by means of the acknowledgement signal ack.

Address differences D1 to Dk that are input to the selector 18 and parameters (i.e., the numerical base of the counter) of the sequencer 22 are set in the configuration register 101. A negative difference value can be represented by equalizing the weight of the most significant bit (MSB) of the address difference with that of the MSB of the output address. A plurality of words may be accessed in bulk in, for example, a burst mode. Thus, the number of bits of the address difference does not necessarily coincide with that of the output address. In general, the value of the address difference is equal to the value of the counter in the sequencer 22 plus one.

Figure 5:
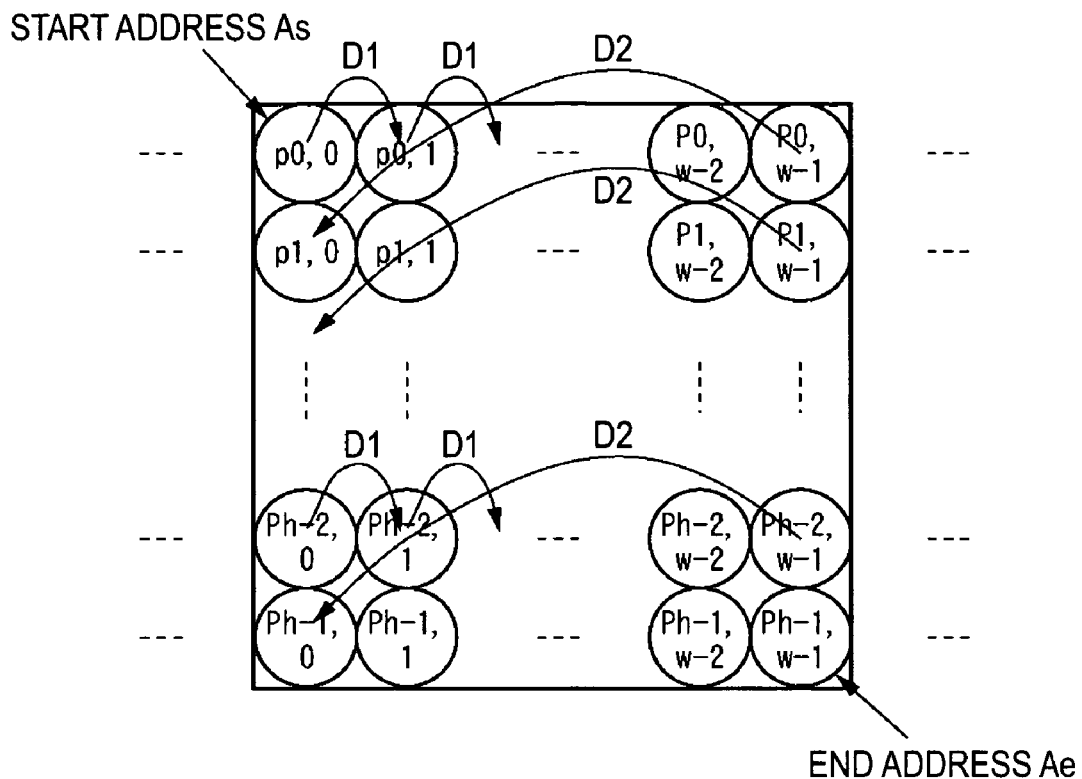
FIG. 5 shows parameters of the address generating unit according to the exemplary embodiment of the present invention.

FIG. 5 shows parameters of the aforementioned address generating unit according to this exemplary embodiment. For example, when blocks of data shown in FIG. 5 are accessed (two-dimensional addressing), a start address As is loaded to the register 20. The sequencer 22 controls the selector 18 so that the selector 18 selects an address difference D1. In this state, the selector 18 selects the address difference D1. Thus, the output of the adding unit 19 is As+D1. When the acknowledgement signal ack is returned, the register 20 outputs As+D1, which is the next address. When it is presumed that the number of data accesses in the horizontal direction is w, the aforementioned operation is repeated (w−1) times.

When an address is generated for the w-th time, the sequencer 22 controls the selector 18 so that the selector selects an address difference D2. Thus, the address generated for the w-th time is As+(w−1)·D1+D2, and the leading data block (P1, 0) of the next line is accessed. Then, when the acknowledgement signal ack is returned, the sequencer 22 controls the selector 18 so that the selector selects the address difference D1.

The sequencer 22 controls the selector 18 so that the selector 18 selects the address difference D2 once every w data accesses and the address difference D1 at other timings of data access, as described above. The sequencer 22 includes a base-w counter. The value (w−1) is first loaded to the base-w counter, and then one is subtracted from the value of the base-w counter every time the acknowledgement signal ack is returned. Subsequently, the value of the base-w counter becomes zero. Then, when the acknowledgement signal ack is returned, (w−1) is reloaded to the base-w counter. When the value of the base-w counter becomes zero, a signal for selecting the address difference D2 is generated. Thus, in this case (two-dimensional addressing), the parameters of the address generating unit are the start address As, an end address Ae, a parameter W that holds the number of data accesses in the horizontal direction (the setting value is (w−1)), and the address differences D1 and D2. These parameters are stored in the configuration register 101.

For example, when addresses correspond to data blocks that are adjacent to each other, as shown in FIG. 5, then D1 is equal to one. When data blocks are accessed from right to left, then D1 is set to −1. Similarly, the data access direction can be rotated by 90° or addresses of data blocks that are accessed can be nonconsecutive by appropriately setting the aforementioned parameters. In the case where the data access direction is rotated by 90°, a parameter H that holds the number of data accesses in the vertical direction is used instead of the parameter W, which holds the number of data accesses in the horizontal direction.

Figure 6:
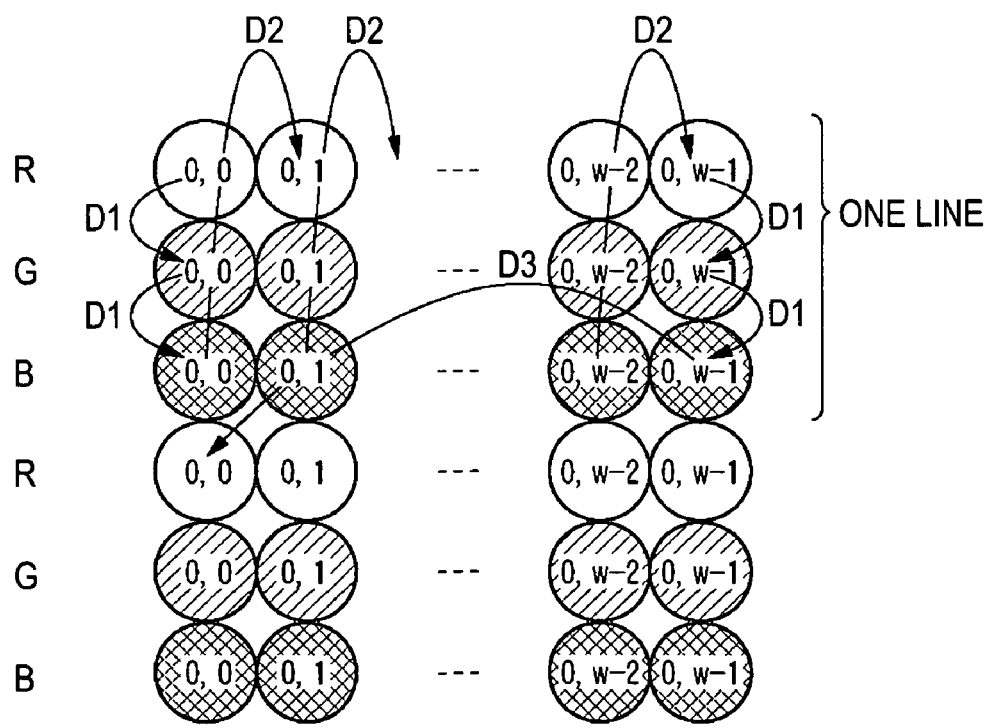
FIG. 6 shows another operational sequence of the address generating unit according to the exemplary embodiment of the present invention.

FIG. 6 shows another operational sequence of the aforementioned address generating unit according to this exemplary embodiment. For example, when RGB line-sequential data shown in FIG. 6 is converted to dot-sequential data (three-dimensional addressing), the sequencer 22 controls the selector 18 so that the selector 18 repeats a set of operations: selecting an address difference D1 two times and then selecting an address difference D2 once. When this set of operations is repeated (w−1) times, the sequencer 22 controls the selector 18 so that the selector 18 selects an address difference D3.

To achieve this addressing, the sequencer 22 includes a base-c counter and a base-w counter. A value (c−1) (in this case, the number c is the number of planes and is equal to three) is first loaded to the base-c counter, and one is subtracted from the value of the base-c counter every time the acknowledgement signal ack is returned. Subsequently, the value of the base-c counter becomes zero. Then, when the acknowledgement signal ack is returned, (c−1) is reloaded to the base-c counter. A value (w−1) is first loaded to the base-w counter. Then, one is subtracted from the value of the base-w counter every time the value of the base-c counter becomes zero and the acknowledgement signal ack is returned. Subsequently, in a case where the values of the base-c counter and the base-w counter become zero, when the acknowledgement signal ack is returned, (w−1) is reloaded to the base-w counter. In this arrangement, the sequencer 22 generates a signal for selecting the address difference D3 in the case where the values of the base-c counter and the base-w counter are zero, a signal for selecting the address difference D2 in the case where only the value of the base-c counter is zero, and a signal for selecting the address difference D1 in other cases.

Thus, in this case (three-dimensional addressing), the parameters of the address generating unit are the start address As, an end address Ae, a parameter C that holds the number of planes (the setting value is (c−1)), a parameter W that holds the number of data accesses in the horizontal direction (the setting value is (w−1)), and the address differences D1, D2, and D3. These parameters are stored in the configuration register 101. Similarly, plane-sequential data can be converted to dot-sequential data by setting the address difference D1 as the address difference between color planes. Moreover, bi-directional scanning can be achieved by converting D2 (in the case of FIG. 5, D1) to a two's complement when reverse scanning is performed. In this case, a scanning-direction determining unit, a two's-complement conversion input selector, a two's-complement conversion unit, and a two's-complement conversion output selector are additionally required. Alternatively, bi-directional scanning can be achieved by adding a difference register for reverse scanning to increase the number of dimensions by one.

The process flows that occur in individual connection states will now be described with reference to specific types of processing.

First Processing Mode (High-Precision and High-Speed Processing)

Figure 7:
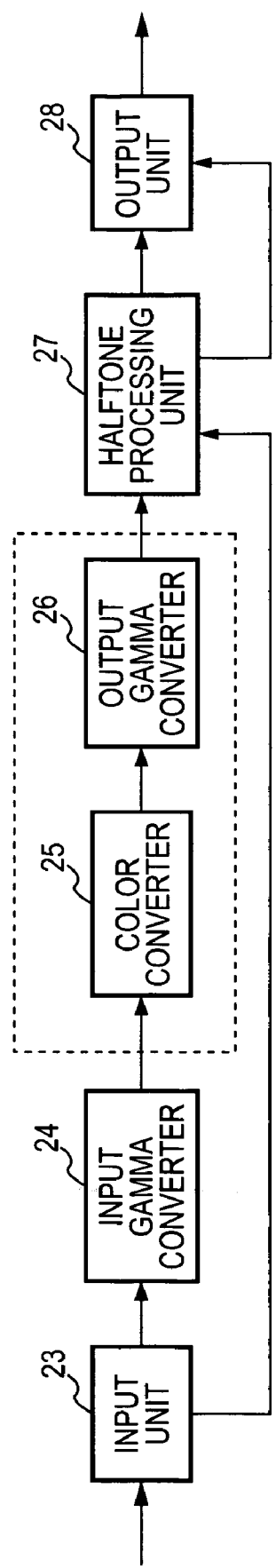
FIG. 7 is a block diagram showing a first processing mode of an image-processing module according to the exemplary embodiment of the present invention.

FIG. 7 is a block diagram showing a first processing mode of the image-processing module 4 according to this exemplary embodiment. As shown in FIG. 7, the image-processing module 4 includes an input unit 23, an input gamma converter 24, a color converter 25, an output gamma converter 26, a halftone processing unit 27, and an output unit 28. In this module, a CMY plane (band) sequential bitmap is generated from RGB dot-sequential data.

The input gamma converter 24 converts RGB dot-sequential data read from the input unit 23 to signals that are linear in density, and the color converter 25 converts these signals, which are print data, to density data of color materials of a printer (colors produced by an output device). Then, the output gamma converter 26 performs output gamma correction, and the halftone processing unit 27 converts the output data from the output gamma converter 26 to bitmap data (a dot pattern) to be output from the output unit 28. When error diffusion method is used as a method for halftone processing of image data, a quantization error of the preceding line is input from the input unit 23 to the halftone processing unit 27. Moreover, the quantization error is output from the output unit 28 to the DRAM 7 to diffuse the quantization error to surrounding pixels. Since an error buffer is formed on the DRAM 7, the limitation on the number of pixels in the horizontal direction is removed.

In general, the color converter 25 outputs only one type of color material data at a time to reduce the number of hardware components and to remove the limitation on the number of types of color materials. Thus, for example, when color materials of a printer are three colors cyan, magenta, and yellow, the module is activated three times to generate bitmaps of the three colors.

Figure 8:
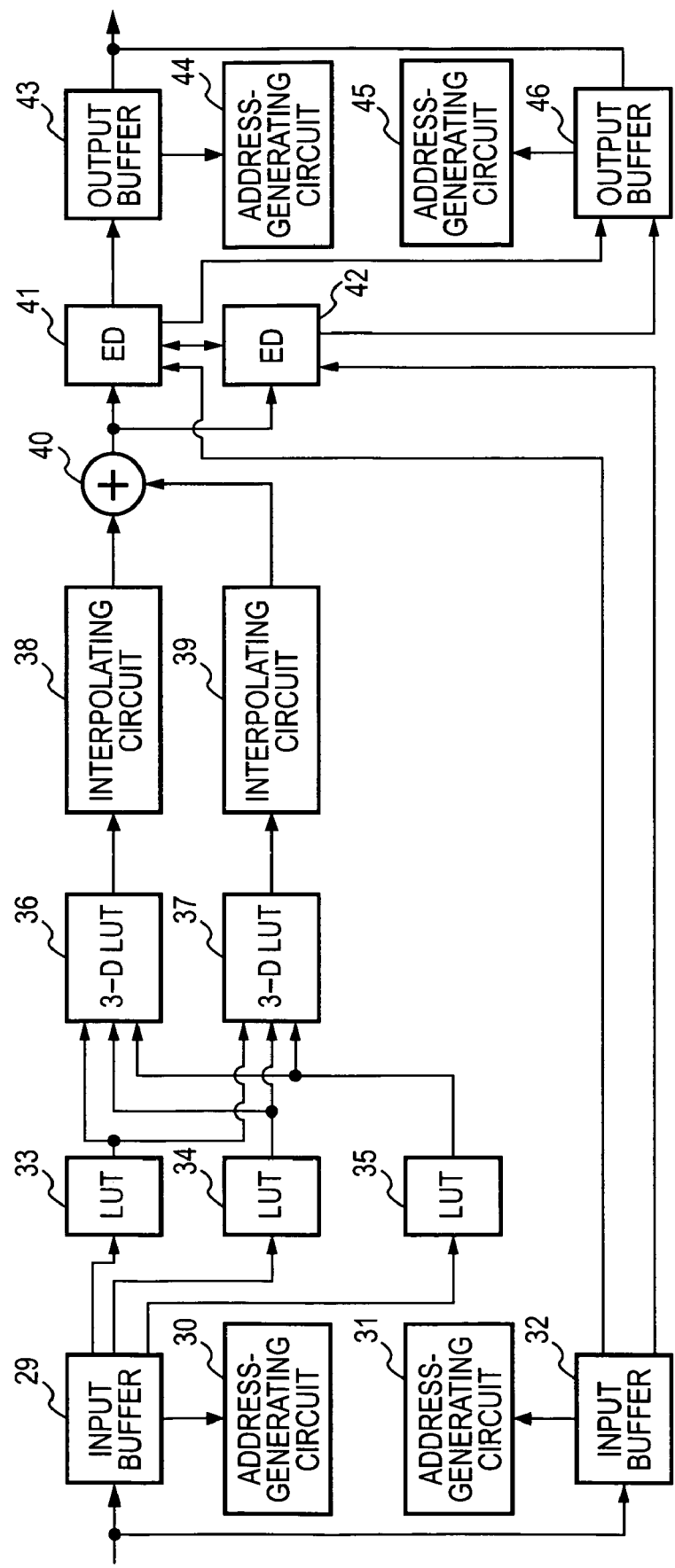
FIG. 8 is a block diagram showing connections between sub-modules in the first processing mode.

FIG. 8 is a block diagram showing connections between sub-modules that perform the functions shown in FIG. 7. As shown in FIG. 8, the image-processing module 4 includes an input buffer 29 for image data, an address-generating circuit 30 for input image data, an address-generating circuit 31 for input error data, an input buffer 32 for error data, an input-gamma conversion look-up table (LUT) 33 for R signals, an input-gamma conversion LUT 34 for G signals, an input-gamma conversion LUT 35 for B signals, a high-order-bit color conversion three-dimensional (3-D) LUT 36, a low-order-bit color conversion 3-D LUT 37, an interpolating circuit 38 for the high-order-bit color conversion 3-D LUT 36, an interpolating circuit 39 for the low-order-bit color conversion 3-D LUT 37, an adding unit 40 for combining interpolated outputs, a high-order-bit error diffusion circuit 41, a low-order-bit error diffusion circuit 42, an output buffer 43 for image data, an address-generating circuit 44 for output image data, an address-generating circuit 45 for output error data, and an output buffer 46 for error data.

As shown in FIG. 2, the configuration includes a group of a read buffer and a read-address generating unit and a group of a write buffer and a write-address generating unit. On the other hand, the image-processing module 4, which will be described below, includes two groups of a read buffer and a read-address generating unit and two groups of a write buffer and a write-address generating unit. This is because read and write buffers are provided for error data and image data.

When there is a free space equal to or more than a predetermined amount in the input buffer 29, the address-generating circuit 30 submits a request to the arbiter 5 and simultaneously generates and outputs an address of the DRAM 7 in accordance with the order of data processing. Image data read from the DRAM 7 is stored in the input buffer 29, and RGB components of the image data are input to input-gamma conversion LUTs 33, 34, and 35, respectively. Each of the input-gamma conversion LUTs 33, 34, and 35 is a table for input gamma correction, which includes 256 entries and outputs 16-bit data in this exemplary embodiment. In this case, when 8-bit input image data is input to the table, 16-bit data stored in entries corresponding to the 8-bit input image data are output from the table as gamma-corrected data. Predetermined scaling is performed on data to be stored in these LUTs to reduce required spaces of the 3-D LUTs and to simplify the interpolating circuits in subsequent stages, as described below.

The 8 high-order bits of each of the 16-bit gamma-corrected RGB data components are converted to lattice point data by the high-order-bit color conversion 3-D LUT 36 and are then subjected to linear interpolation in the interpolating circuit 38 so as to be output as output color data. At this time, the aforementioned output gamma correction is simultaneously performed by storing lattice point data on which output gamma correction is performed in the high-order-bit color conversion 3-D LUT 36. In this exemplary embodiment, the high-order-bit color conversion 3-D LUT 36 is an LUT that outputs high-order bits of corresponding lattice points in a small color space on the basis of the 4 high-order bits of individual first input RGB data components, each first input RGB data component being the 8 high-order bits of each 16-bit gamma-corrected RGB data component. A small color space is a small cube surrounded by lattice points of RGB that are adjacent to each other. In the 3-D LUT, when the table is generated corresponding to all input data, the table becomes too large. Thus, the whole input color space is divided into small color spaces (small cubes), and vertices of each small color space are stored in the table. Conversion to the output color space is performed by selecting a small color space (lattice point data) from high-order bits of each input data and performing linear interpolation on the basis of distances from the input lattice points. This LUT includes 4096 entries and outputs 8-bit data. Specifically, this LUT outputs the 8 high-order bits of corresponding lattice points on the basis of the 4 high-order bits of each first input RGB data component. On the other hand, the 4 low-order bits of each first input RGB data component are directly input to the interpolating circuit 38. The interpolating circuit 38 performs linear interpolation on the lattice point data output from the high-order-bit color conversion 3-D LUT 36 on the basis of the 4 low-order bits of each first input RGB data component so as to generate output color data. In this case, when the aforementioned small color space is a triangular pyramid, the number of lattice points is four. Thus, an interpolation calculation performed by the interpolating circuit 38 is a quadrinomial product-sum operation.

Similarly, the low-order-bit color conversion 3-D LUT 37 is an LUT that outputs low-order bits of corresponding lattice points in a small color space on the basis of the 4 high-order bits of individual second input RGB data components, each second input RGB data component being the 8 low-order bits of each 16-bit gamma-corrected RGB data component. For example, when this LUT includes 4096 entries and outputs 8-bit data, this LUT outputs the 8 low-order bits of corresponding lattice points on the basis of the 4 high-order bits of each second input RGB data component. On the other hand, the 4 low-order bits of each second input RGB data component are directly input to the interpolating circuit 39. The interpolating circuit 39 performs linear interpolation on the lattice point data output from the low-order-bit color conversion 3-D LUT 37 on the basis of the 4 low-order bits of each second input RGB data component so as to generate output color data.

In a case where the corresponding lattice point data is generated on the basis of the 4 high-order bits of each of the first and second input RGB data components, when assignment of the lattice point data is performed without scaling, individual RGB coordinate axes are divided into 16 sections. Thus, the required number of the lattice points is 17 (16+1) for each axis. That is to say, when it is assumed that the number of sections of each axis is N, (N+1)3 lattice points are required. In this case, the required number of the lattice points is 4913 (17×17×17). Thus, the amount of required space is hard to handle, and access is complicated. Accordingly, the number of lattice points is reduced to 4096 (16×16×16) by performing scaling by a factor of fifteen sixteenths in advance when input gamma conversion is performed, as described above. Though scaling needs to be performed by a factor of sixteen fifteenths to restore the scale of the data after linear interpolation to the original scale, this operation can be omitted by performing scaling on the lattice point data to be stored in the 3-D LUTs by a factor of sixteen fifteenths in advance.

The adding unit 40 adds the high-order bits of the interpolated data and the low-order bits of the interpolated data after decimal point alignment to obtain 16-bit converted color data. At this time, the fractional portion of the number is rounded off, and a value out of the input range is adjusted to the maximum or minimum value.

On the other hand, when there is a free space equal to or more than a predetermined amount in the input buffer 32, the address-generating circuit 31 submits a request to the arbiter 5 and simultaneously generates an address of the DRAM 7 in accordance with the order of data processing. Error data read from the DRAM 7 is stored in the input buffer 32. Then, high-order bits and low-order bits of the error data are input to the high-order-bit error diffusion circuit 41 and the low-order-bit error diffusion circuit 42, respectively. The low-order-bit error diffusion circuit 42 generates low-order bits of a correction value that is added to input data on the basis of the low-order bits of the aforementioned interpolated data and the low-order bits of the quantization error in error diffusion and inputs these low-order bits to the high-order-bit error diffusion circuit 41. The high-order-bit error diffusion circuit 41 generates high-order bits of the correction value on the basis of the high-order bits of the aforementioned interpolated data and the high-order bits of the quantization error and adds the high-order bits of the correction value and the low-order bits of the correction value from the low-order-bit error diffusion circuit 42 to input image data.

The input image data, to which the correction value is added, is quantized, the quantization error and the quantized code (1-bit data in a case of binary data) are input to the output buffer 46 and the output buffer 43, respectively. When a predetermined number of pieces of data are accumulated in the output buffer 43, the address-generating circuit 44 submits a request to the arbiter 5 and simultaneously generates and outputs a write address in the DRAM 7. On the other hand, when a predetermined number of pieces of error data are accumulated in the output buffer 46, the address-generating circuit 45 submits a request to the arbiter 5 and simultaneously generates and outputs a write address in the DRAM 7. The high-order bits and the low-order bits of the quantization error are separately stored in this exemplary embodiment for the sake of simplifying the illustration. Alternatively, the high-order bits and the low-order bits of the quantization error may be stored together in the same address.

In this processing mode, when the processing described above is repeated for each of YMC, tables to which the 3-D LUTs 36 and 37 refer need to be prepared for each of YMC and switched. In this exemplary embodiment, the tables, to which the 3-D LUTs 36 and 37 refer, are switched by setting the parameters in the configuration register 101.

In this configuration, the weight is put on the precision of internal arithmetic and high-speed processing, and one piece of image data can be processed each clock cycle by pipelining with 16-bit precision of internal arithmetic.

Second Processing Mode (High-Speed Processing)

Figure 9:
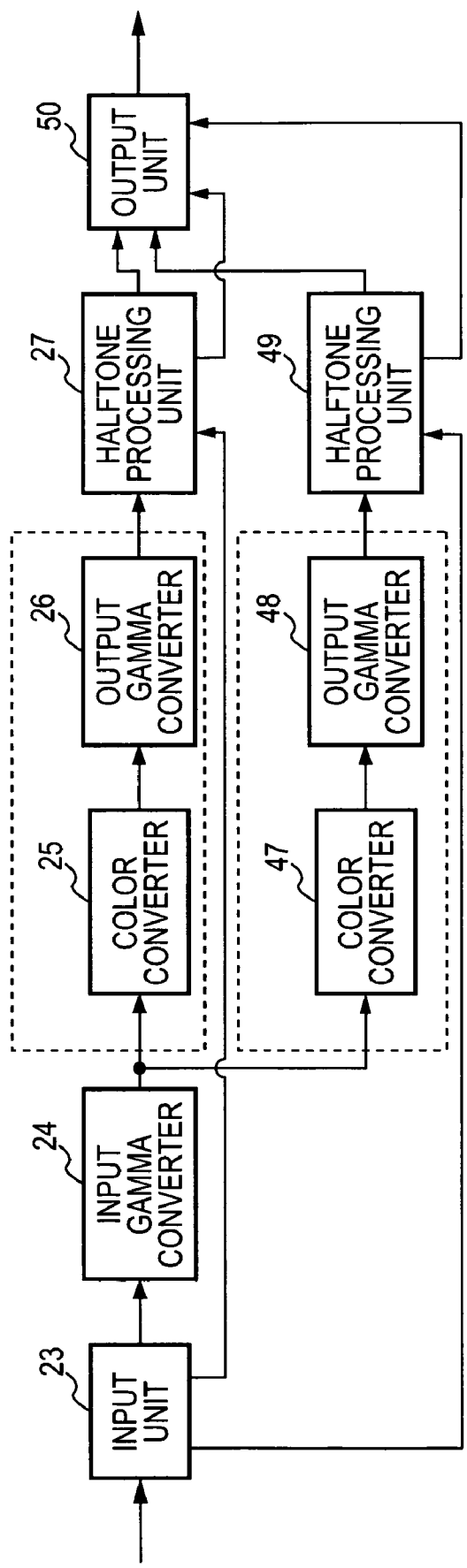
FIG. 9 is a block diagram showing a second processing mode of the image-processing module according to the exemplary embodiment of the present invention.

FIG. 9 is a block diagram showing a second processing mode of the image-processing module 4 according to this exemplary embodiment. As shown in FIG. 9, the image-processing module 4 includes a color converter 47, an output gamma converter 48, a halftone processing unit 49, and an output unit 50. The same reference numerals as in FIG. 7 are assigned to corresponding function blocks in FIG. 9, and these function blocks will not be described below.

This module includes pairs of color converters, output gamma converters, and halftone processing units, and generates cyan, magenta, yellow, and black (CMYK) plane (band) sequential bitmaps of two colors from RGB dot-sequential data at a time.

The input gamma converter 24 converts RGB dot-sequential data read from the input unit 23 to signals that are linear in density, and the color converters 25 and 47 convert these signals, which are print data, to respective pieces of density data of different color materials (colors produced by an output device). Then, the output gamma converters 26 and 48 perform output gamma correction on the respective pieces of color material data, and the halftone processing units 27 and 49 respectively convert the output pieces of data from the output gamma converters 26 and 48 to pieces of bitmap data (dot patterns) to be output from the output unit 50 to buffer areas (band buffers) of the individual pieces of color material data. Similarly, quantization error data is also output to the buffer areas of the individual pieces of color material data.

Figure 10:
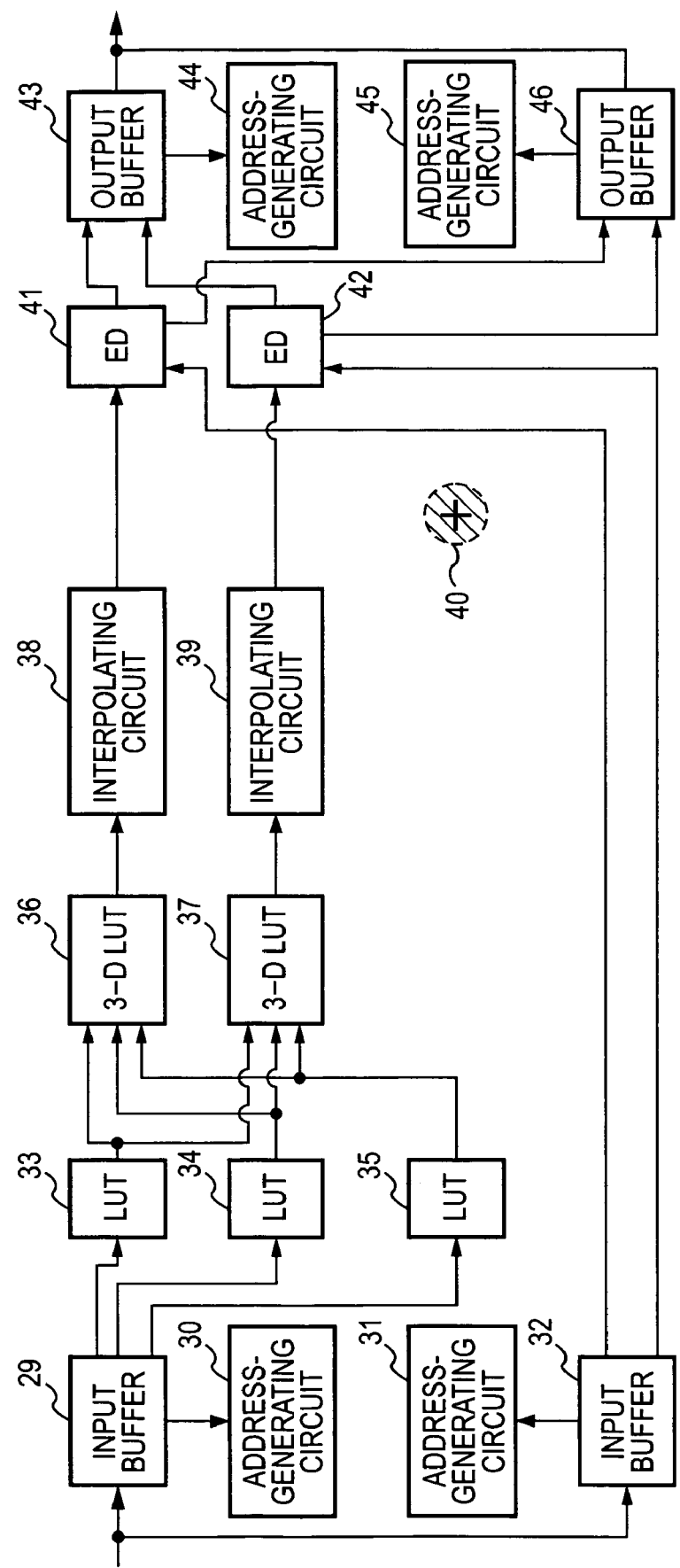
FIG. 10 is a block diagram showing connections between sub-modules in the second processing mode.

FIG. 10 is a block diagram showing connections between sub-modules for implementing the function blocks shown in FIG. 9. The same reference numerals as in FIG. 8 are assigned to corresponding sub-modules in FIG. 10, and only the difference between FIGS. 8 and 10 will now be described.

Individual pieces of lattice point data corresponding to different output colors are stored in the 3-D LUTs 36 and 37 and are linear interpolated by the interpolating circuits 38 and 39 to be input to the error diffusion circuits 41 and 42. The pieces of data having been subjected to pseudo-halftone processing in the error diffusion circuits 41 and 42 are separately stored in the output buffer 43. The 8 high-order bits of 16-bit data, on which input gamma correction is performed, from each of the input-gamma conversion LUTs 33 to 35 are input to the 3-D LUTs 36 and 37. The 3-D LUTs 36 and 37 obtain the individual pieces of lattice point data on the basis of the 4 high-order bits of the input 8-bit data and supply the individual pieces of lattice point data and the 4 low-order bits of the input 8-bit data to the interpolating circuits 38 and 39, respectively. The interpolating circuits 38 and 39 interpolate the individual pieces of lattice point data on the basis of the 4 low-order bits. The error diffusion circuits 41 and 42 perform error diffusion for each color.

When a predetermined number of pieces of data are accumulated in the output buffer 43, the address-generating circuit 44 submits a request to the arbiter 5 and simultaneously generates and outputs write addresses in the DRAM 7. At this time, an additional address difference is added to generate addresses of two band buffers by selecting the address differences every predetermined number of bytes, and thus the pieces of data are stored in the two band buffers. On the other hand, when a predetermined number of pieces of error data are accumulated in the output buffer 46, the address-generating circuit 45 submits a request to the arbiter 5 and simultaneously generates and outputs a write address in the DRAM 7. The quantization errors corresponding to individual colors are separately stored in this case for the sake of simplifying the illustration. Alternatively, the quantization errors may be stored together in the same address. In this case, an additional address difference is not required in the address-generating circuit 45, and the quantization errors need not separately stored in the output buffer 46.

In this processing mode, two colors are processed at a time, and thus a processing speed twice as fast as is achieved when one color is processed at a time. However, the number of bits for the lattice point data of one color is reduced by half. Thus, this processing mode is not suitable for a case where a high-precision color conversion is required, but a case where high-speed processing is required.

Third Processing Mode

Figure 11:
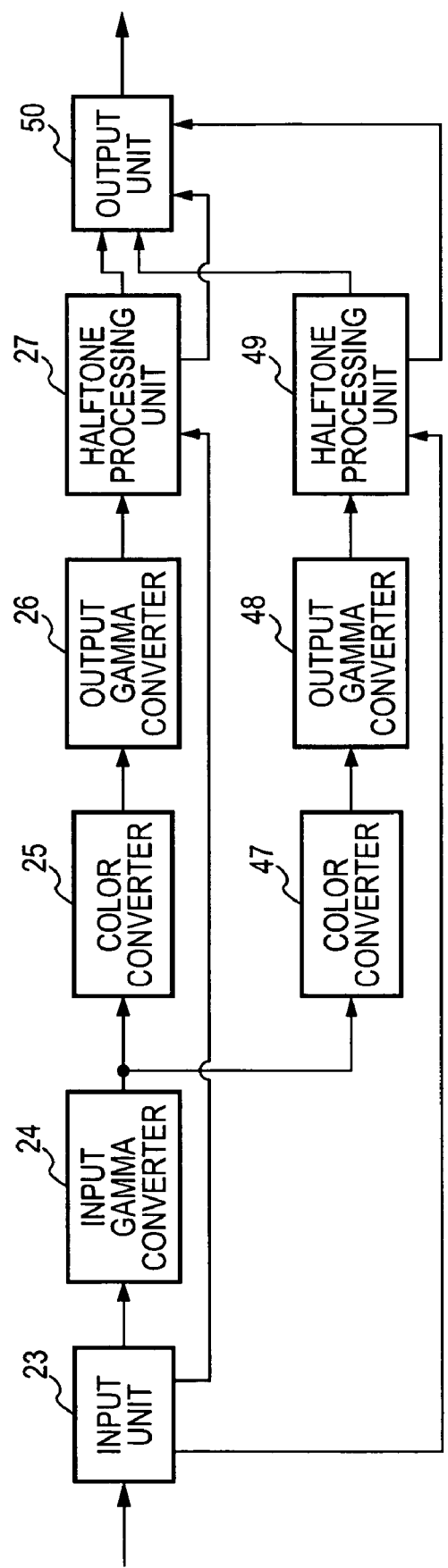
FIG. 11 is a block diagram showing a third processing mode of the image-processing module according to the exemplary embodiment of the present invention.

FIG. 11 is a block diagram showing a third processing mode of the image-processing module 4 according to this exemplary embodiment. The same reference numerals as in FIG. 9 are assigned to corresponding function blocks in FIG. 11, and these function blocks will not be described below.

This module generates CMYK plane (band) sequential bitmaps of two colors from RGB dot-sequential data at a time as in the second processing mode. This module further handles input image data that is extended color space data. Thus, this module has a high precision of internal arithmetic. Specifically, an interpolation calculation is introduced to improve the input precision of input gamma correction, and output gamma correction is performed independent of the color converters. FIG. 11 is different from FIG. 9 only in that there is no dashed line that indicates one integrated process shared by the color converters and the output gamma converters in FIG. 11, and thus the configuration shown in FIG. 11 will not be described.

Figure 12:
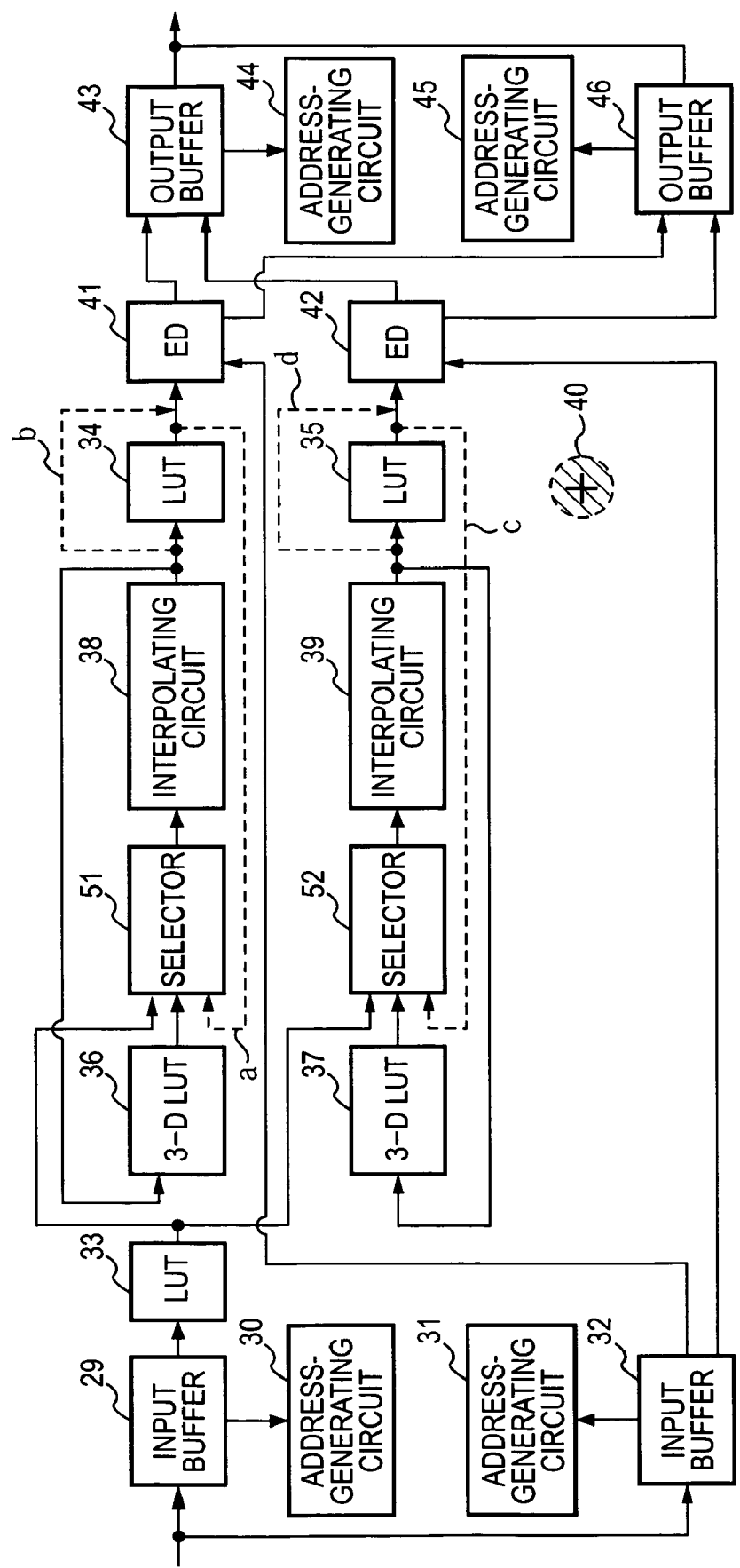
FIG. 12 is a block diagram showing connections between sub-modules in the third processing mode.

FIG. 12 is a block diagram showing connections between sub-modules for implementing the function blocks shown in FIG. 11. As shown in FIG. 12, selectors 51 and 52 are provided. The same reference numerals as in FIG. 10 are assigned to corresponding sub-modules in FIG. 12, and only the difference between FIGS. 10 and 12 will now be described.

The input-gamma conversion LUT 33 is a table for input gamma correction. For example, when the input-gamma conversion LUT 33 includes 256 entries and outputs 16-bit data, the 8 high-order bits of input image data are input to the input-gamma conversion LUT 33, and 16-bit gamma-corrected data is output from the input-gamma conversion LUT 33. In this case, when data of more than 8 bits (for example, 16-bit data) is input to the input-gamma conversion LUT 33 as the input image data, two representative values corresponding to the 8 high-order bits of the input image data are read from the input-gamma conversion LUT 33, and the interpolating circuit 38 performs interpolation on the two representative values on the basis of the remaining low-order bits to obtain 16-bit data on which input gamma correction is performed.

It is presumed that the input value zero is converted to zero in the input-gamma conversion LUT 33. Thus, representative values corresponding to input value zero are not stored in the input-gamma conversion LUT 33. All representative values except for zero are stored in the input-gamma conversion LUT 33. Similarly, it is presumed that the maximum value is output in a case where the maximum value is input. Thus, representative values corresponding to the maximum value may not be stored in the input-gamma conversion LUT 33. However, scaling by a factor of fifteen sixteenths is performed on each input color in this exemplary embodiment, as described above. Thus, when representative values corresponding to the maximum value are not stored in the input-gamma conversion LUT 33, scaling by a factor of fifteen sixteenths must be performed on the maximum value to be output. In this processing mode, the interpolating circuits 38 and 39 are used to perform interpolation on the representative values. Thus, the output data from the input-gamma conversion LUT 33 is input to the interpolating circuits 38 and 39 via the selectors 51 and 52. The interpolating circuits 38 and 39 generate interpolated data by first interpolation (binomial product-sum operation) and input the interpolated data to the color conversion 3-D LUTs 36 and 37, respectively.

The operation of the interpolating circuits 38 and 39 is changed according to the situation: binomial product-sum operation is performed when interpolation is performed on the output data from the input-gamma conversion LUT 33, and quadrinomial product-sum operation is performed when interpolation is performed on the output data from the 3-D LUT 36.

When the pieces of data, corresponding to RGB colors, on which input gamma correction is performed, are input to the color conversion 3-D LUTs 36 and 37, the color conversion 3-D LUTs 36 and 37 respectively input corresponding pieces of lattice point data to the interpolating circuits 38 and 39 via the selectors 51 and 52. The interpolating circuits 38 and 39 generate pieces of data of individual output colors by linear interpolation (quadrinomial product-sum operation), output gamma correction is performed on the pieces of data output from the interpolating circuits 38 and 39 in the output-gamma conversion LUTs 34 and 35, and the pieces of data processed in the output-gamma conversion LUTs 34 and 35 are input to the error diffusion circuits 41 and 42.

In this case, the number of bits output from the color conversion 3-D LUTs 36 and 37 is equal to or less than the number of bits input to the output-gamma conversion LUTs 34 and 35. Thus, the pieces of data output from the output-gamma conversion LUTs 34 and 35 are directly input to the error diffusion circuits 41 and 42. However, in a case where a high-precision output gamma correction is required, the pieces of data output from the output-gamma conversion LUTs 34 and 35 may be further subjected to linear interpolation in the interpolating circuits 38 and 39, respectively, and the pieces of interpolated data may be input to the error diffusion circuits 41 and 42, as shown by dashed lines. That is to say, the pieces of data output from the LUTs 34 and 35 may be respectively input to the interpolating circuits 38 and 39 via the selectors 51 and 52, as shown by paths a and c, and the pieces of interpolated data output from the interpolating circuits 38 and 39 may be input to the error diffusion circuits 41 and 42, respectively, as shown by paths b and d. In this case, although the number of cycles required for processing increases, an increase in the processing time is small compared with an increase in the number of cycles in view of the utilization ratio of the bus of the DRAM 7.

In this configuration, since input gamma correction is performed with one LUT, six cycles are required for input gamma correction. Moreover, the interpolating circuits are shared by more than one operation. Thus, processing of one pixel requires eight cycles in total on the assumption that two cycles are required for interpolation of the color conversion 3-D LUTs. However, when available clocks are doubled by performing linear interpolation (quadrinomial product-sum operation) and error diffusion as multi-cycle processes, the required processing time is substantially equal to or less than that required for four cycles because the improvement of the efficiency of bus arbitration can be expected. Moreover, when an interpolating circuit that performs first interpolation (binomial product-sum operation) is added in a stage subsequent to the input-gamma conversion LUT 33, the required processing time is equal to or less than that required for three cycles. Moreover, when an LUT is added to obtain two representative values at a time, the required processing time is equal to or less than that required for one and a half cycles.

Fourth Processing Mode

Figure 13:
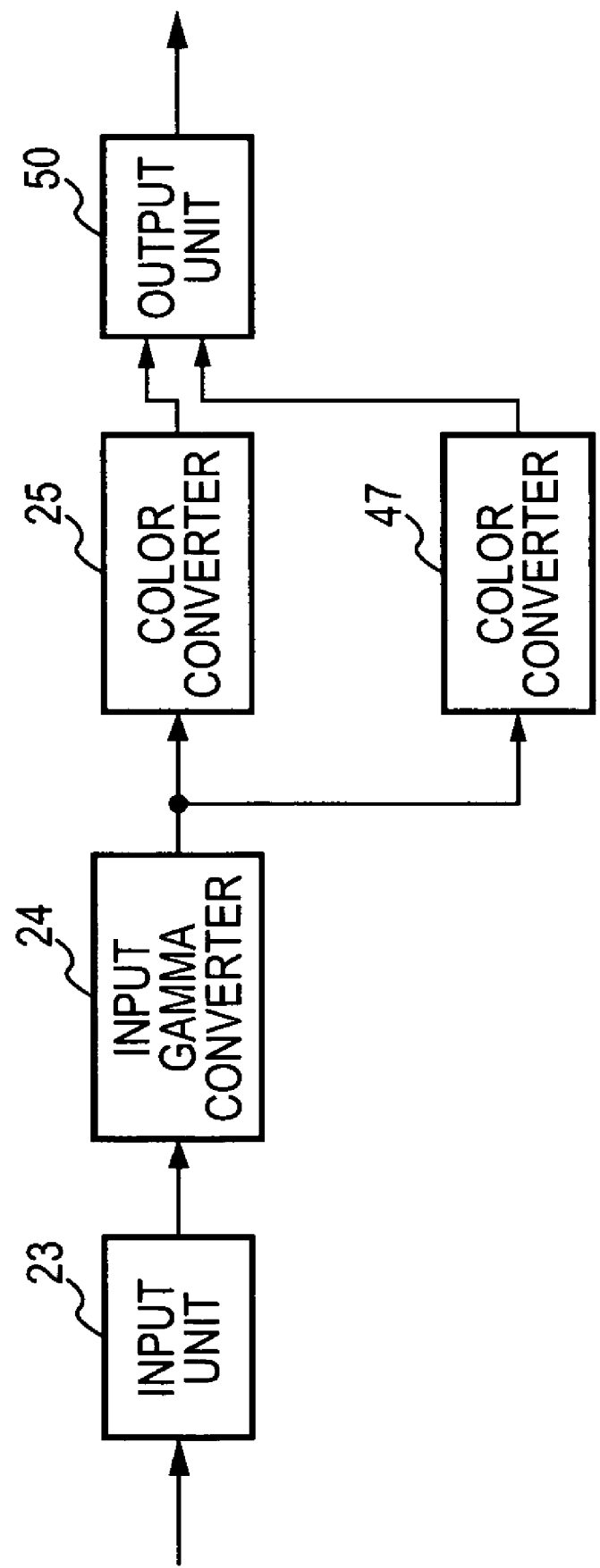
FIG. 13 is a block diagram showing a fourth processing mode of the image-processing module according to the exemplary embodiment of the present invention.

FIG. 13 is a block diagram showing a fourth processing mode of the image-processing module 4 according to this exemplary embodiment. The same reference numerals as in FIG. 11 are assigned to corresponding function blocks in FIG. 13, and these function blocks will not be described below.

When the number of output device colors is more than three, the process of color conversion performed by the color converter is divided into two separate steps: a first step of color matching and a second step of device color conversion. This arrangement is adopted to, for example, readily generate the 3-D LUT and to improve the continuity of achromatic colors. In the fourth processing mode, the first step is implemented. Thus, pieces of color data converted by the color converters 25 and 47 are output from the output unit 50 to buffer areas (band buffers) of the individual pieces of color data.

Figure 14:
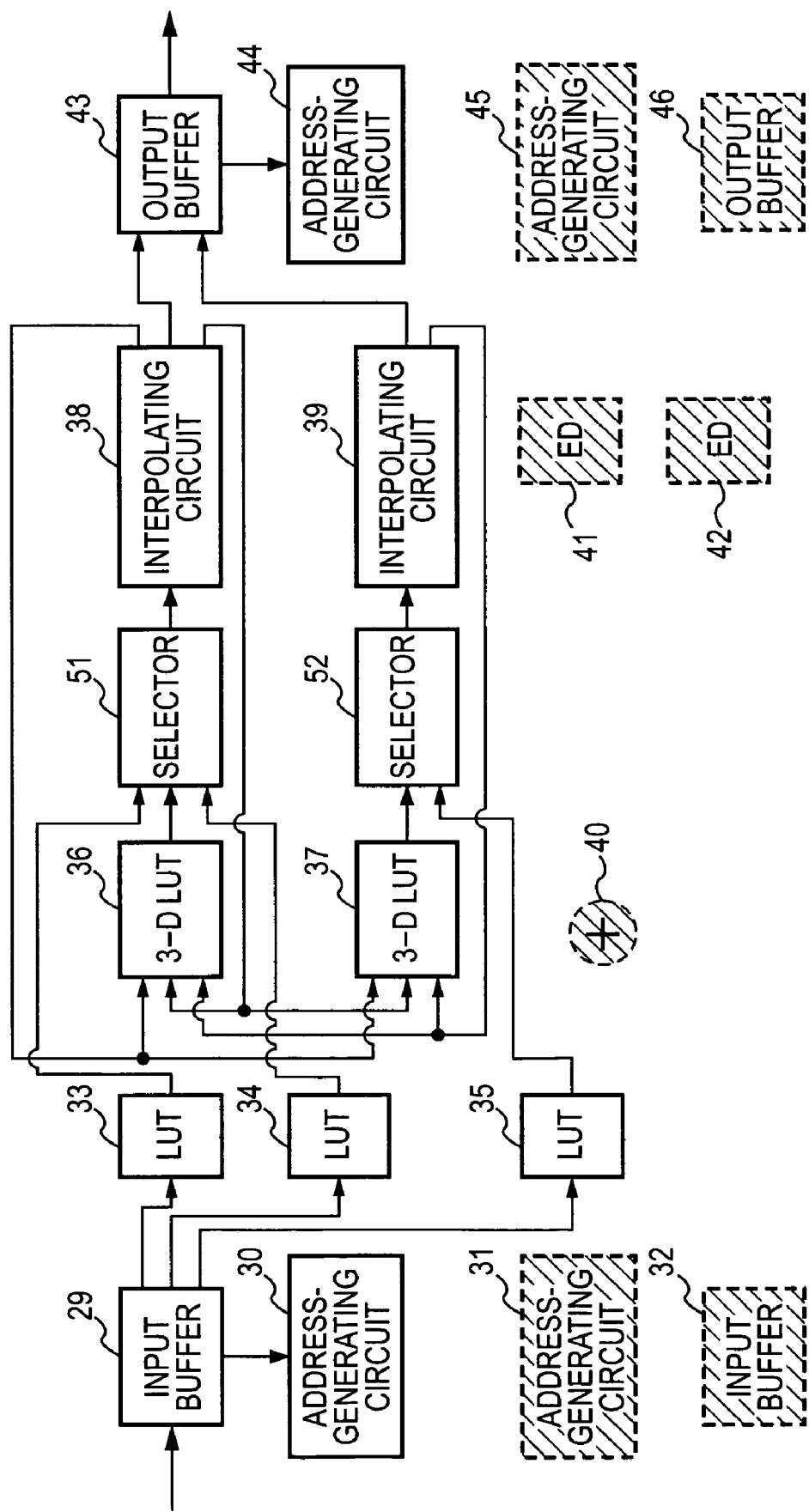
FIG. 14 is a block diagram showing connections between sub-modules in the fourth processing mode.

FIG. 14 is a block diagram showing connections between sub-modules for implementing the function blocks shown in FIG. 13. The same reference numerals as in FIG. 10 are assigned to corresponding sub-modules in FIG. 14, and only the difference between FIGS. 10 and 14 will now be described.

In the fourth processing mode, color conversion (the first step) is performed, and error diffusion is not performed. Thus, the address-generating circuit 31, the input buffer 32, the adding unit 40, the error diffusion circuits 41 and 42, the address-generating circuit 45, and the output buffer 46 are deactivated.

The input-gamma conversion LUTs 33, 34, and 35 are tables for input gamma correction. For example, when each input-gamma conversion LUT includes 256 entries and outputs 16-bit data, the 8 high-order bits of input image data are input to the input-gamma conversion LUT, and 16-bit gamma-corrected data is output from the input-gamma conversion LUT. In this case, when data of more than 8 bits (for example, 16-bit data) is input to the input-gamma conversion LUT as the input image data, two representative values corresponding to the 8 high-order bits of the input image data are read from the input-gamma conversion LUT, and interpolation is performed on the two representative values on the basis of the remaining 8 low-order bits to obtain 16-bit data on which input gamma correction is performed.

It is presumed that the input value zero is converted to zero in the input-gamma conversion LUT. Thus, representative values corresponding to input value zero are not stored in the input-gamma conversion LUTs 33, 34, and 35. All representative values except for zero are stored in the input-gamma conversion LUTs 33, 34, and 35. In this exemplary embodiment, scaling is performed, as described above. Thus, when representative values corresponding to the maximum value are not stored in the input-gamma conversion LUTs, scaling must be performed on the maximum value to be output.

In this exemplary embodiment, when the input image data is data of more than 8 bits, the interpolating circuits 38 and 39 are used to perform interpolation on the representative values. Thus, pieces of data output from the input-gamma conversion LUTs 33 and 34 are input to the interpolating circuit 38 via the selector 51, and data output from the input-gamma conversion LUT 35 is input to the interpolating circuit 39 via the selector 52. The interpolating circuits 38 and 39 generate pieces of interpolated data by first interpolation (binomial product-sum operation) and input the pieces of interpolated data to the color conversion 3-D LUTs 36 and 37, respectively. The interpolating circuit 38 performs interpolation on two colors at a time by breaking a quadrinomial product-sum operation into two binomial product-sum operations.

When the pieces of data, corresponding to RGB colors, on which input gamma correction is performed, are input to the color conversion 3-D LUTs 36 and 37, the color conversion 3-D LUTs 36 and 37 respectively input corresponding pieces of lattice point data to the interpolating circuits 38 and 39 via the selectors 51 and 52. The interpolating circuits 38 and 39 generate pieces of data of individual colors on which color matching is performed by linear interpolation (quadrinomial product-sum operation) and store the pieces of data of individual colors in the output buffer 43. At this time, one of the following three modes for packing the data into 32-bit strings is adopted: a buffer-saving mode, a precision mode, or a double-precision mode.

In the buffer-saving mode, data of each color is rounded off to 8 bits, and pieces of data of four pixels are packed into a 32-bit string and stored in the output buffer 43.

In the precision mode, pieces of data of three pixels for each color are packed into 32-bit strings and stored in the output buffer 43. Two sets of consecutive 11 bits and one set of consecutive 10 bits in each 32-bit string are assigned to three pixels in a predetermined sequence, for example, 11 bits, 11 bits, and 10 bits from the most significant bit (MSB) to the least significant bit (LSB). In the precision mode, phases of sequences for three colors are varied so that the locations of consecutive 10 bits in individual 32-bit strings of RGB data do not coincide with each other. For example, 11 bits, 11 bits, and 10 bits of R data are packed into a 32-bit string in this sequence (sequence 0), 11 bits, 10 bits, and 11 bits of G data are packed into a 32-bit string in this sequence (sequence 1), and 10 bits, 11 bits, and 11 bits of B data are packed into a 32-bit string in this sequence (sequence 2). When the pixel data is packed, the locations of the MSBs in any 32-bit string are fixed, thereby simplifying data extraction and preventing failure of data extraction even when a mismatch occurs between the positions of 10-bit data in 32-bit strings in packing and unpacking.

Specifically, in all sequences 0 to 2, the MSBs are bit 31, bit 20, and bit 9. When 11-bit data occupies bits 9 to 0 (sequence 1 or 2), the 11-bit data is packed so that the LSB of the 11-bit data is disposed at an end of the 11-bit data near the LSB of 10-bit data. That is to say, 10 bits that start from the MSB are always located at the same positions regardless of the type of sequence. In this arrangement, in order to generate 11-bit data from 10-bit data, the eleventh bit (LSB) for the 10-bit data is generated by, for example, (1) interpolating with the preceding value, i.e., the LSB of the preceding pixel data or (2) interpolating with pixel data having a strong correlation with the 10-bit data, i.e., the LSB of a piece of pixel data that is least different from the 10-bit data out of pieces of pixel data that are adjacent to the 10-bit data.

In the double-precision mode, data of each color is rounded off to 16 bits, and pieces of data of two pixels are packed into a 32-bit string and stored in the output buffer 43.

In any of the aforementioned modes, in a case where processing of data of the end of a line (the right end of an image) completes, when the data of the end of the line does not occupy all bits of the corresponding 32-bit string, zero is packed in the unoccupied bits and the corresponding 32-bit string is stored in the output buffer 43. Then, all data stored in the output buffer 43 is written to the DRAM 7 (flashing) regardless of the occupancy of the output buffer 43. By means of this operation, the last data is prevented from remaining in the output buffer 43, and data access in units of lines is facilitated. This operation is effective especially when the processing direction (the scanning direction) is changed for each line.

This module generates RGB plane (band) sequential data of two colors from RGB dot-sequential data at a time. When the output color space is for three colors of RGB, processing of two colors of RB are performed at a time, and subsequently, processing of only one color of G is performed. When processing of one color is performed, the color converter 47 may be used for high-precision processing. That is to say, low-order bits of the lattice point data are stored in the 3-D LUT 37, data output from the interpolating circuit 39 is combined in the adding unit 40, and the resulting data is rounded off to a predetermined number of bits to be stored in the DRAM 7 via the output buffer 43. The quality of an image can be efficiently improved by performing high-precision processing of G signals having a high visibility.

Fifth Processing Mode

Figure 15:
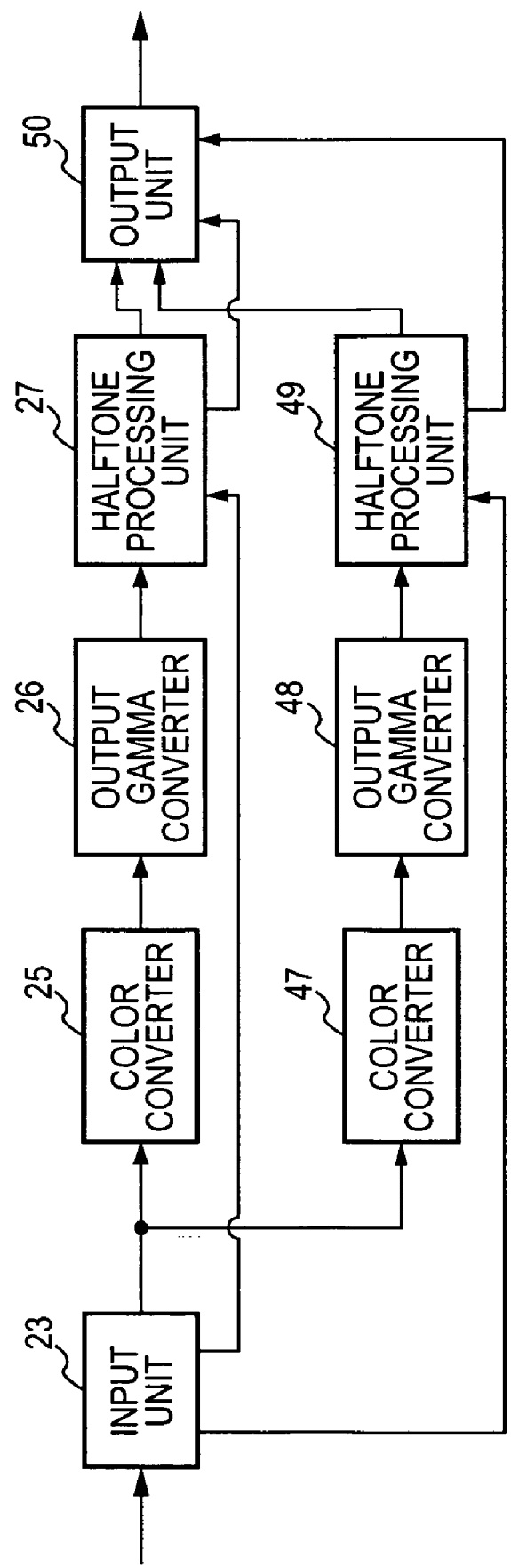
FIG. 15 is a block diagram showing a fifth processing mode of the image-processing module according to the exemplary embodiment of the present invention.

FIG. 15 is a block diagram showing a fifth processing mode of the image-processing module 4 according to this exemplary embodiment. The same reference numerals as in FIG. 11 are assigned to corresponding function blocks in FIG. 15, and these function blocks will not be described below.

In the case where the process of color conversion performed by the color converter is divided into the first step of color matching and the second step of device color conversion, the second step is implemented in the fifth processing mode. Thus, the data processed in the first step in the fourth processing mode is read via the input unit 23. The color converters 25 and 47 convert the read data to respective pieces of data of different color materials (device colors). Then, the output gamma converters 26 and 48 perform output gamma correction on the respective pieces of color material data, and the halftone processing units 27 and 49 respectively convert the output pieces of data from the output gamma converters 26 and 48 to pieces of bitmap data (dot patterns) to be output from the output unit 50 to buffer areas (band buffers) of the individual pieces of color material data. Similarly, quantization error data is also output to the buffer areas of the individual pieces of color material data.

Figure 16:
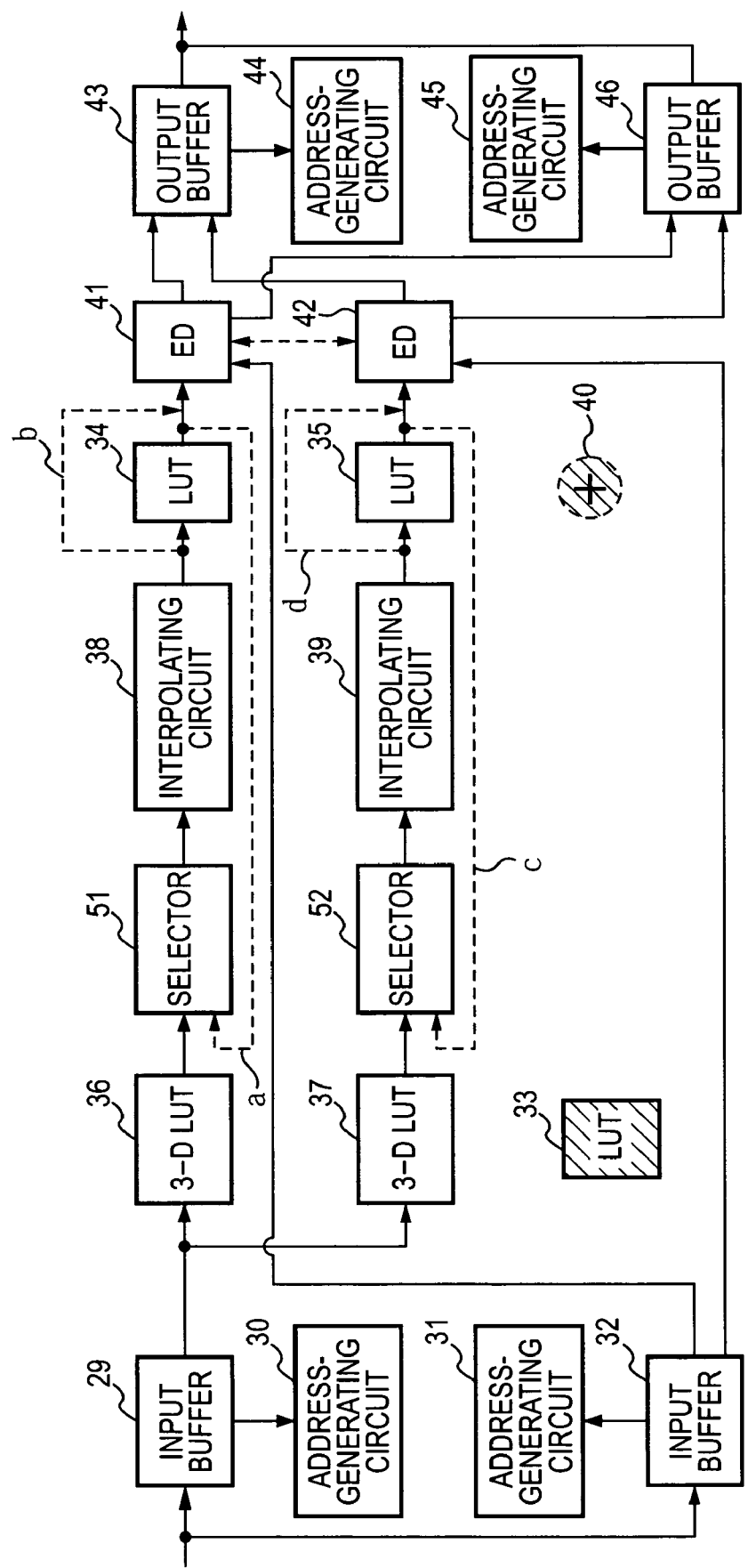
FIG. 16 is a block diagram showing connections between sub-modules in the fifth processing mode.

FIG. 16 is a block diagram showing connections between sub-modules for implementing the function blocks shown in FIG. 15. The same reference numerals as in FIG. 12 are assigned to corresponding sub-modules in FIG. 16, and only the difference between FIGS. 12 and 16 will now be described.

In this processing mode, color conversion (the second step) and the subsequent processing are performed. Thus, the input-gamma conversion LUT 33 and the adding unit 40 are deactivated. Since the data processed in the first step is the input data, the format of the input data is that of RGB plane (band) sequential data.

When there is a free space equal to or more than a predetermined amount in the input buffer 29, the address-generating circuit 30 submits a request to the arbiter 5 and simultaneously generates and outputs an address of the DRAM 7 in accordance with the order of data processing. At this time, since plane (band) sequential data is converted to dot-sequential data, address generation as shown in FIG. 6 is performed (the address difference D1 is set as the address difference between buffers).

Image data read from the DRAM 7 is stored in the input buffer 29, and RGB components of the image data are input to the color conversion 3-D LUTs 36 and 37 at a time. The color conversion 3-D LUTs 36 and 37 respectively input corresponding pieces of lattice point data to the interpolating circuits 38 and 39 via the selectors 51 and 52. The interpolating circuits 38 and 39 generate pieces of data of individual output colors by linear interpolation (quadrinomial product-sum operation), output gamma correction is performed on the pieces of data output from the interpolating circuits 38 and 39 in the output-gamma conversion LUTs 34 and 35, and the pieces of data processed in the output-gamma conversion LUTs 34 and 35 are input to the error diffusion circuits 41 and 42.

In this case, the number of bits output from the color conversion 3-D LUTs 36 and 37 is equal to or less than the number of bits input to the output-gamma conversion LUTs 34 and 35. Thus, the pieces of data output from the output-gamma conversion LUTs 34 and 35 are directly input to the error diffusion circuits 41 and 42. However, in a case where a high-precision output gamma correction is required, the pieces of data that are linear interpolated by the interpolating circuits 38 and 39 may be input to the error diffusion circuits 41 and 42, as shown by dashed lines. That is to say, the pieces of data output from the LUTs 34 and 35 may be respectively returned to the selectors 51 and 52 through paths a and c, and these pieces of data may be interpolated by the interpolating circuits 38 and 39 to be supplied to the error diffusion circuits 41 and 42, respectively, through paths b and d.

In the fifth processing mode, CMYK plane (band) sequential bitmaps of two colors are generated from RGB plane (band) sequential data at a time. For example, when the output colors are four colors of CMYK, processing of two colors of CM is first performed. Subsequently, processing of two colors of YK is performed. At this time, the dispersibility of dots between two colors can be improved by causing the error diffusion circuits 41 and 42 to cooperate with each other.

When the number of output colors is odd, processing of only one color is performed. In this case, the color converter 47 may be used for high-precision processing (16-bit processing), as described below.

Figure 17:
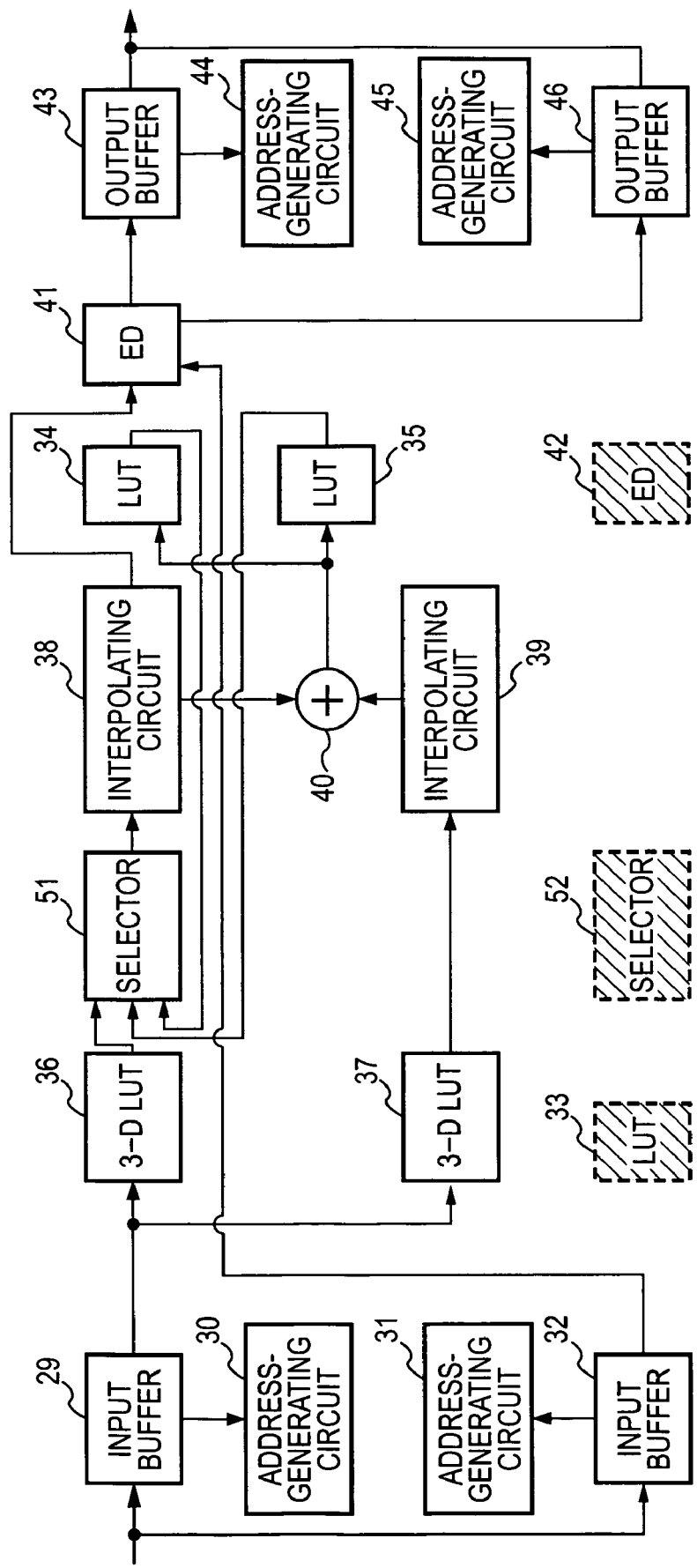
FIG. 17 is a block diagram showing other connections between the sub-modules in the fifth processing mode.
Figure 18:
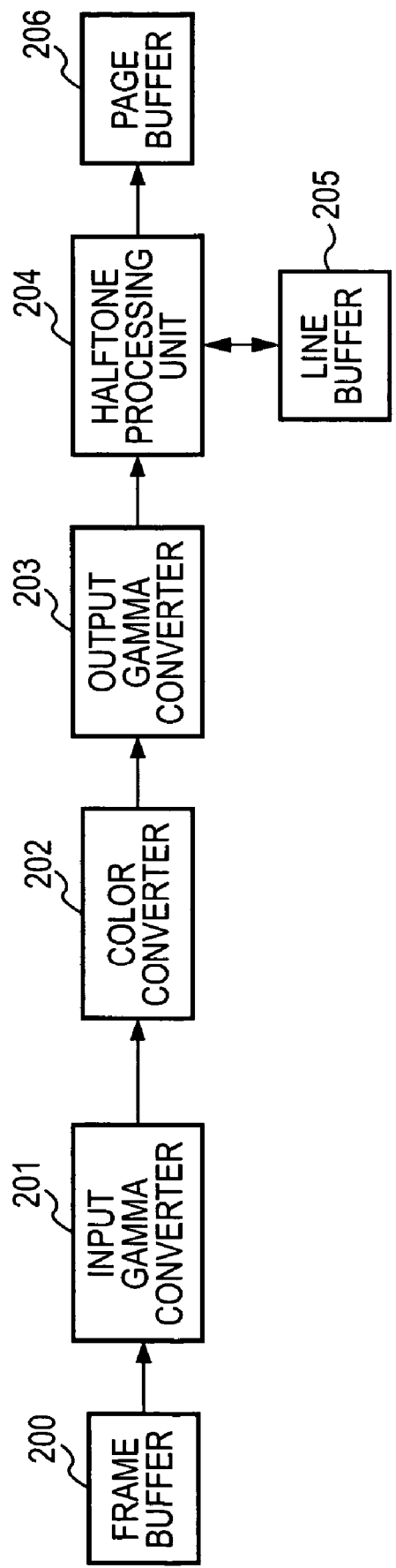
FIG. 18 is a block diagram showing the structure of a known image-processing unit.

FIG. 17 is a block diagram showing connections between sub-modules in a case where processing of one color (high-precision processing) is performed. The same reference numerals as in FIG. 16 are assigned to corresponding sub-modules in FIG. 17, and only the difference between FIGS. 16 and 17 will now be described.

The color conversion 3-D LUT 36 outputs high-order bits of corresponding lattice points in a small color space on the basis of high-order bits of input RGB data components, and the color conversion 3-D LUT 37 outputs low-order bits of corresponding lattice points in a small color space on the basis of high-order bits of the input RGB data components. The high-order bits of lattice points in a small color space output from the color conversion 3-D LUT 36 are supplied via the selector 51 to and linear interpolated by the interpolating circuit 38 to be input to the adding unit 40. On the other hand, the low-order bits of lattice points in a small color space output from the color conversion 3-D LUT 37 are supplied to and linear interpolated by the interpolating circuit 39 to be input to the adding unit 40. The adding unit 40 adds the high-order bits of the interpolated data and the low-order bits of the interpolated data after decimal point alignment. At this time, the fractional portion of the number is rounded off, and a value out of the input range is adjusted to the maximum or minimum value.

The combined interpolated data is input to output-gamma conversion LUTs 34 and 35. The aforementioned two representative values are generated in one clock cycle by means of two LUTs and supplied to the interpolating circuit 38 via the selector 51. The interpolating circuit 38 performs linear interpolation on the representative values and inputs the interpolated data to the error diffusion circuit 41. In this configuration, there is no part operating in a multi-cycle mode. Thus, pipeline processing can be performed with all of the sub-modules, thereby enabling high-speed and high-precision processing.

As described above, in the aforementioned exemplary embodiments, a compact and flexible image-processing apparatus that can operate in various processing modes can be provided by arranging the configuration of sub-modules with consideration of hardware resources required for image processing so that connections between the sub-modules, the sequence of processes, the precision of calculation, and the like can be changed. Moreover, since supply of a clock pulse or power to any deactivated sub-module can be stopped, power consumption can be controlled in addition to the processing speed, the precision of processing, and the like. Thus, an optimal configuration can be selected according to the type of processing.

Moreover, since the image input unit is configured so that the image input unit can handle various formats, split processing (multi-sequence processing) can be performed. Thus, any part of processing that cannot be handled with given hardware resources can be delegated to other modules, a processor (such as a CPU), or the like.

More than one exemplary embodiment is described above for the sake of the illustration. Those skilled in the art will readily understand that the present invention can be realized by any one of these exemplary embodiments or any combination of these exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-368529 filed Dec. 20, 2004, which is hereby incorporated by reference herein in its entirety.

What is claimed is:

1. A data processing apparatus comprising:
a plurality of pipeline processing units that each perform a respective one of process parts into which a predetermined pipeline process to be performed on data is divided;
a configuration register, corresponding to the plurality of pipeline processing units in the predetermined pipeline process, that stores setting parameters indicating an order of each of the pipeline processing units in the predetermined pipeline process; and
a switch matrix configured to dynamically change connections between the plurality of pipeline processing units to connect each pipeline processing unit in the predetermined pipeline process to another pipeline processing unit in the predetermined pipeline process in accordance with the order specified by the setting parameters stored in the configuration register for each of the pipeline processing units in the predetermined pipeline process,
wherein the switch matrix transfers data from one of the pipeline processing units to another in accordance with the order specified by the setting parameters stored in the configuration register for each of the pipeline processing units in the predetermined pipeline process, and transfers stall information from one of the pipeline processing units to another in accordance with a reverse order of the order specified by the setting parameters stored in the configuration register for each of the pipeline processing units in the predetermined pipeline process, when at least one of the pipeline processing units is busy.

2. The data processing apparatus according to claim 1, further comprising:
a reading unit that includes a first address generating unit and a first buffer connected to the switch matrix, the first address generating unit generating a read address on the basis of the setting parameters, and that reads data from an external memory on the basis of the read address and stores the data in the first buffer;
wherein, in data processing in the plurality of pipeline processing units, the predetermined pipeline process is performed on the data stored in the first buffer,
wherein the switch matrix changes the connection between one of the pipeline processing units and the first buffer, and wherein the pipeline processing unit connected to the first buffer reads data stored in the first buffer.

3. The data processing apparatus according to claim 2, wherein handshaking is performed with a valid signal that indicates validity of output data and a hold signal for submitting a data-hold request in a case where data exchange is performed among the first buffer, the second buffer, and the plurality of pipeline processing units.

4. The data processing apparatus according to claim 2, wherein the data stored in the external memory is image data in a dot-sequential, line-sequential, or plane-sequential form, and the first address generating unit generates the read address on the basis of the setting parameters so that the image data stored in the external memory is read in the dot-sequential form.

5. The data processing apparatus according to claim 2, further comprising a signal-output unit that outputs a signal that indicates that an operation is completed when the reading unit completes reading of data in an address range specified by the setting parameters and/or when the writing unit completes writing of data in an address range specified by the setting parameters.

6. The data processing apparatus according to claim 1, wherein the switch matrix can switch between a first procedure in which a plurality of pieces of data are processed by the plurality of pipeline processing units in parallel and a second procedure in which high-order bits and low-order bits that are obtained by dividing one piece of data are processed by the plurality of pipeline processing units.

7. The data processing apparatus according to claim 1, wherein the plurality of pipeline processing units include a gamma converter, a color converter, and an interpolating unit, and the switch matrix changes the connection so that the interpolating unit can perform interpolation on output data from the gamma converter and on output data from the color converter.

8. The data processing apparatus according to claim 1, wherein supply of an operating clock to any one of the plurality of pipeline processing units can be stopped according to the setting parameters.

9. The data processing apparatus according to claim 1, wherein power supply to any one of the plurality of pipeline processing units can be stopped according to the setting parameters.

10. The data processing apparatus according to claim 1, wherein the switch matrix unit changes the connection so that the data processing apparatus can selectively perform color matching or device color conversion in a color conversion process.

11. The data processing apparatus according to claim 1, wherein packing is performed on output data generated by the predetermined pipeline process so that the output data is packed into 32-bit strings and output, wherein each of the 32-bit strings includes pieces of data of a plurality of pixels.

12. The data processing apparatus according to claim 11, wherein each 32-bit string includes two pieces of 11-bit data of two corresponding pixels and one piece of 10-bit data of one pixel.

13. The data processing apparatus according to claim 12, wherein a location of 10-bit data in each 32-bit string varies with individual output colors.

14. The data processing apparatus according to claim 11, wherein each 32-bit string is divided into one 10-bit area and two 11-bit areas, positions of these areas in the 32-bit string being fixed, and the LSB of a piece of 11-bit data is disposed at a position of the LSB of a 11-bit area on which a piece of 10-bit data is disposed in a case where the piece of 11-bit data is disposed at the 10-bit area.

15. The data processing apparatus according to claim 11, wherein, in a case where 32-bit packed data is unpacked into three pieces of 11-bit data, the eleventh bit of one of the three pieces of 11-bit data corresponding to 10-bit data in the packed data is generated on the basis of a value of 11-bit data that is adjacent to the 10-bit data in the packed data.

16. The data processing apparatus according to claim 11, wherein, in a case where all bits of a 32-bit string are not occupied by data when packing is performed at the end of a line, zero is packed into the unoccupied bit.

17. A data processing apparatus according to claim 1, further comprising:
a writing unit that includes a second address generating unit and a second buffer connected to the switch matrix, the second address generating unit generating a write address on the basis of the setting parameters, and that writes data stored in the second buffer to an external memory on the basis of the write address, wherein, in data processing in the plurality of processing units, the predetermined pipeline process is performed and the resulting data is written to the second buffer, wherein the switch matrix changes the connection between one of the pipeline processing units and the second buffer, and wherein the pipeline processing unit connected to the second buffer writes data to the second buffer.

18. A data processing apparatus according to claim 1, wherein one of the plurality of pipeline processing units, which receives stall information from a next pipeline processing unit in the predetermined order, holds output of the data processed by itself.

19. A data processing apparatus according to claim 1, wherein the switch matrix transmits valid information of the plurality of pipeline processing units in the processing order, wherein one of the pipeline processing units, which receives valid information indicating at least one of the pipeline processing units is holding valid data, starts receiving data from the at least one pipeline processing unit holding valid data.

20. A data processing apparatus comprising:
a plurality of data processing modules;
an external memory; and
a controlling unit,
wherein each of the plurality of data processing modules includes:
a plurality of pipeline processing units that each perform a respective one of pipeline process parts into which a predetermined pipeline process to be performed on data is divided;
a switch matrix configured to dynamically change connections between the plurality of pipeline processing units to connect each pipeline processing unit in the predetermined pipeline to another pipeline processing unit in the predetermined pipeline process in accordance with setting parameters stored in a configuration register for each of the pipeline processing units in the predetermined pipeline process, the setting parameters indicating an order of each of the pipeline processing units in the predetermined pipeline process,
wherein the switch matrix transfers data from one of the pipeline processing units to another in accordance with the order specified by the setting parameters stored in the configuration register for each of the pipeline processing units in the predetermined pipeline process, and transfers stall information from one of the pipeline processing units to another in accordance with a reverse order of the order specified by the setting parameters stored in the configuration register for each of the pipeline processing units in the predetermined pipeline process when at least one of the pipeline processing units is busy;
a reading unit that includes a first address generating unit and a first buffer, the first address generating unit generating a read address on the basis of the setting parameters, and that reads data from the external memory on the basis of the read address and stores the data in the first buffer; and
a writing unit that includes a second address generating unit and a second buffer, the second address generating unit generating a write address on the basis of the setting parameters, and that writes data stored in the second buffer to the external memory on the basis of the write address, wherein the plurality of pipeline processing units perform the plurality of corresponding process parts on the data stored in the first buffer and write the resulting data to the second buffer, wherein the controlling unit detects when the reading unit completes reading of data or when the writing unit completes writing of data and sets the setting parameters so as to control data processing by the data processing modules.

21. A data processing apparatus according to claim 20, wherein the switch matrix can switch between a first procedure in which a plurality of pieces of data are processed by the plurality of pipeline processing units in parallel and a second procedure in which high-order bits and low-order bits that are obtained by dividing one piece of data are processed by the plurality of pipeline processing units.

22. A data processing apparatus according to claim 20, wherein the plurality of pipeline processing units include a gamma converter, a color converter, and an interpolating unit, and the switch matrix changes the connection so that the interpolating unit can perform interpolation on output data from the gamma converter and on output data from the color converter.

23. A data processing apparatus according to claim 20, wherein the switch matrix changes the connection so that the data processing apparatus can selectively perform color matching or device color conversion in a color conversion process.

24. A data processing apparatus comprising:
a plurality of pipeline processing units that each perform a respective one of process parts into which a predetermined pipeline process to be performed on data is divided; and
a switch matrix configured to dynamically change connections between the plurality of processing units to connect each pipeline processing unit in the predetermined pipeline process to another pipeline processing unit in the predetermined process in accordance with setting parameters stored in a configuration register for each of the pipeline processing units in the predetermined pipeline process, the setting parameters indicating an order of each of the pipeline processing units in the predetermined pipeline process,
wherein the switch matrix transfers data from one of the pipeline processing units to another in accordance with the order specified by the setting parameters stored in the configuration register for each of the pipeline processing units in the predetermined pipeline process, and transfers stall information from a first pipeline processing unit to a second pipeline processing unit in accordance with a reverse order of the order specified by the setting parameters stored in the configuration register for each of the pipeline processing units in the predetermined pipeline process when at least one of the pipeline processing units is busy,
wherein each of the first and second pipeline processing units is one of the plurality of pipeline processing units.

25. A data processing apparatus comprising:
a plurality of pipeline processing units each performing a respective one of process parts into which a predetermined pipeline process to be performed on data is divided; and
a switch matrix configured to dynamically change connections between the plurality of pipeline processing units to connect each pipeline processing unit in the predetermined pipeline process to another pipeline processing unit in the predetermined pipeline process in accordance with setting parameters stored in a configuration register for each of the pipeline processing units in the predetermined pipeline process, the setting parameters indicating an order of each of the pipeline processing units in the predetermined pipeline process, wherein the switch matrix transfers data from one of the pipeline processing units to another in accordance with the order specified by the setting parameters stored in the configuration register for each of the pipeline processing units in the predetermined pipeline process, and transmits stall information indicating that a first pipeline processing unit is busy to a second pipeline processing unit in accordance with a reverse order specified by the setting parameters stored in the configuration register for each of the pipeline processing units in the predetermined pipeline process.

\* \* \* \* \*